US008385843B2

(12) United States Patent
Imamura et al.

(10) Patent No.: US 8,385,843 B2
(45) Date of Patent: *Feb. 26, 2013

(54) SEQUENCE GENERATION METHOD AND SEQUENCE GENERATION DEVICE

(75) Inventors: Daichi Imamura, Kanagawa (JP); Takashi Iwai, Ishikawa (JP); Kazunori Inogai, Kanagawa (JP); Sadaki Futagi, Ishikawa (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,249

(22) Filed: Nov. 17, 2011

(65) Prior Publication Data
US 2012/0064837 A1 Mar. 15, 2012

Related U.S. Application Data

(63) Continuation of application No. 12/531,864, filed as application No. PCT/JP2008/000637 on Mar. 18, 2008, now Pat. No. 8,085,724.

(30) Foreign Application Priority Data

Mar. 19, 2007 (JP) ................................ 2007-071194

(51) Int. Cl.
*H04B 1/38* (2006.01)
(52) U.S. Cl. ............................ 455/73; 455/403; 370/329
(58) Field of Classification Search .................... 455/73, 455/103; 370/329
See application file for complete search history.

(56) References Cited

U.S. PATENT DOCUMENTS

| | | |
|---|---|---|
| 2003/0123529 A1 | 7/2003 | Takano |
| 2008/0194259 A1 | 8/2008 | Vujcic et al. |
| 2008/0235314 A1 | 9/2008 | Lee et al. |
| 2009/0073944 A1 | 3/2009 | Jiang et al. |
| 2009/0109919 A1 | 4/2009 | Bertrand et al. |
| 2009/0202021 A1 | 8/2009 | Cheng et al. |
| 2010/0039998 A1 | 2/2010 | Imamura et al. |
| 2010/0232318 A1 | 9/2010 | Sarkar |
| 2010/0311458 A1 | 12/2010 | Nakao et al. |
| 2011/0013715 A1 | 1/2011 | Lee et al. |
| 2011/0182328 A1 | 7/2011 | Imamura et al. |

FOREIGN PATENT DOCUMENTS

| | | |
|---|---|---|
| JP | 2003-198504 A | 7/2003 |
| WO | 00/31622 A1 | 6/2000 |

OTHER PUBLICATIONS

"3rd Generation Partnership Project; Technical Specification Group Radio Access Network; Physical Channels and Modulation (Release 8)," 3GPP TS 36.211 V1.0.0 (Mar. 2007), 2006, 30 pages.
Chu, "Polyphase Codes With Good Periodic Correlation Properties," IEEE Transaction on Information Theory 18:531-532, 1972.

(Continued)

*Primary Examiner* — Lana N Le
*Assistant Examiner* — Hsin-Chun Liao
(74) *Attorney, Agent, or Firm* — Seed IP Law Group PLLC

(57) ABSTRACT

Disclosed are a sequence report method and a sequence report device for reducing a signaling amount for reporting a Zadoff-Chu sequence or a GCL sequence allocated for a cell. Indexes starting at 1 are correlated to different ZC sequences and are allocated for cells so that the indexes are continuous. When such ZC sequences are reported from BS to UE, a start index indicating the start of the continuous indexes is combined with the number of allocated sequences and they are reported as allocation sequence information by a report channel. The UE and the BS share the correlation between the ZC sequences and the indexes and the UE identifies a usable sequence number according to the correlation and the allocation sequence information reported from the BS.

18 Claims, 21 Drawing Sheets

OTHER PUBLICATIONS

Huawei, "Efficient matched filters for paired root Zadoff-Chu sequences," R1-071409, Agenda Item: 7.4 RACH, TSG RAN WG1 meeting #48bis, St. Julian's, Malta, Mar. 26-30, 2007, 4 pages.

International Search Report, for corresponding International Application No. PCT/JP2008/000637, mailed Jun. 24, 2008, 3 pages.

Lawrey, OFDM as a modulation technique for wireless communications, with a CDMA comparison: Chapter 1, Sky DSP, copyright 1997-2001, retrieved on Sep. 16, 2011, from http://www.skydsp.com/publications/4thyrthesis/chapter1.htm, 22 pages.

Office Action, for corresponding Japanese Application No. 2009-510763, mailed Jan. 4, 2011, 3 pages.

Panasonic, NTT DoCoMo, "Zadoff-Chu sequence allocation on RACH for complexity reduction," R1-070189, Agenda Item: 6.5.1, TSG-RAN WG1 Meeting #47bis, Sorrento, Italy, Jan. 15-19, 2007, 4 pages.

Popovic, "Generalized Chirp-Like Polyphase Sequences with Optimum Correlation Properties," IEEE Transaction on Information Theory 38(4):1406-1409, 1992.

Popovic, "Spreading Sequences for Multicarrier CDMA Systems," IEEE Transactions on Communications 47 (6):918-926, 1999.

Qualcomm Europe, "RACH sequences and planning," R1-062690, Agenda Item: 6.4.3, 3GPP TSG-RAN WG1 #46bis, Seoul, Korea, Oct. 9-13, 2006, 11 pages.

Texas Instruments, "Non synchronized Random Access Sequence Design for E-UTRA," R1-062004, Agenda Item: 8.3.1, 3GPP TSG RAN WG1 #46, Tallinn, Estonia, Aug. 28-Sep. 1, 2006, 4 pages.

Texas Instruments, Inc., "Non Synchronized Random Access Procedure in E-UTRA," R1-063212, Agenda Item: 6.3.1, 3GPP TSG RAN WG1 #47, Riga, Latvia, Nov. 6-10, 2006, 5 pages.

Zhang et al., "Cyclostationarity-based Doppler Spread Estimation in Mobile Fading Channels," Draft dated Feb. 5, 2008, presented at IEEE Global Telecommunications Conference, San Francisco, CA, 2006, 18 pages.

Extended European Search Report, dated Jan. 3, 2013, for corresponding European Application No. 12162147.8, 8 pages.

LG Electronics, "Ways to Mitigate Frequency Offset with CAZAC Cyclic Shift," R1-070227, Agenda Item: 6.5.1, 3GPP TSG RAN WG1 Meeting #47bis, Sorrento, Italy, Jan. 15-19, 2007, 8 pages.

Nokia, "Restricted Sets of RACH Preamble signatures for environments with high Doppler shifts," R1-070377, Agenda Item: 6.5.1, 3GPP TSG RAN WG1 #47bis, Sorrento, Italy, Jan. 15-19, 2007, 6 pages.

Texas Instruments, "Non Synchronized Random Access Design for High Doppler Conditions," R1-063214, Agenda Item: 6.3.1, 3GPP TSG RAN WG1 #47, Riga, Latvia, Nov. 6-10, 2006, 7 pages.

| INDEX | SEQUENCE NUMBER (r) |
|---|---|
| 1 | 1 |
| 2 | N-1 |
| 3 | 2 |
| 4 | N-2 |
| 5 | 3 |
| 6 | N-3 |
| ⋮ | ⋮ |
| N-4 | (N-1)/2-1 |
| N-3 | N-((N-1)/2-1) |
| N-2 | (N-1)/2 |
| N-1 | N-((N-1)/2) |

| INDEX | SEQUENCE NUMBER (r) |
|---|---|
| 1 | 11 |
| 2 | N-11 |
| 3 | (N-1)/2 |
| 4 | N-(N-1)/2 |
| 5 | N-1 |
| 6 | 1 |
| ... | ... |
| N-4 | (N-1)/2-1 |
| N-3 | N-((N-1)/2-1) |
| N-2 | 3 |
| N-1 | N-3 |

CONFIGURATION WITH (a, N-a) PAIRS CONSECUTIVE. a ORDER MAY BE ARBITRARY.

(a, N-a) ORDER MAY BE ARBITRARY

FIG.9

| INDEX | SEQUENCE NUMBER (r) | |
|---|---|---|
| 1 | 1 | N-1 |
| 2 | 2 | N-2 |
| 3 | 3 | N-3 |
| 4 | 4 | N-4 |
| 5 | 5 | N-5 |
| ⋮ | ⋮ | ⋮ |
| (N-1)/2-2 | (N-1)/2-2 | N-((N-1)/2-2) |
| (N-1)/2-1 | (N-1)/2-1 | N-((N-1)/2-1) |
| (N-1)/2 | (N-1)/2 | N-((N-1)/2) |

| NUMBER-OF-ALLOCATED-SEQUENCES REPORT BITS | NUMBER OF ALLOCATED SEQUENCES |
|---|---|
| 001 | 1 |
| 010 | 2 |
| 011 | 4 |
| 100 | 8 |
| 101 | 16 |
| 110 | 32 |
| 111 | 64 |

| CELL SIZE (RADIUS) | NUMBER OF CYCLIC SHIFT SEQUENCES THAT CAN BE GENERATED FROM ONE SEQUENCE | REQUIRED NUMBER OF ALLOCATED SEQUENCES |
|---|---|---|
| − 1.87 km | 64 | 1 |
| 1.87 − 3.75 km | 32 | 2 |
| 3.75 − 7.5 km | 16 | 4 |
| 7.5 − 15 km | 8 | 8 |
| 15 − 30 km | 4 | 16 |
| 30 − 60 km | 2 | 32 |
| 60 km − | 1 | 64 |

| INDEX | SEQUENCE NUMBER (r) |
|---|---|
| 1 | 1 |
| 2 | N-1 |
| 3 | 2 |
| 4 | N-2 |
| 5 | 3 |
| 6 | N-3 |
| ... | ... |
| N-4 | floor(N/2)-1 |
| N-3 | N-(floor(N/2)-1) |
| N-2 | floor(N/2) |
| N-1 | N-floor(N/2) |

FIG.16B

| INDEX | SEQUENCE NUMBER (r) | |
|---|---|---|
| 1 | 1 | N-1 |
| 2 | 2 | N-2 |
| 3 | 3 | N-3 |
| ... | ... | ... |
| (N-1)/2-1 | floor(N/2)-1 | N-(floor(N/2)-1) |
| (N-1)/2 | floor(N/2) | N-floor(N/2) |

FIG.16C

| INDEX | SEQUENCE NUMBER (r) | | | |
|---|---|---|---|---|
| 1 | 1 | N-1 | 2 | N-2 |
| ... | 3 | N-3 | ... | ... |
| (N-1)/4 | floor(N/2)-1 | N-(floor(N/2)-1) | floor(N/2) | N-floor(N/2) |

| INDEX TYPE | PREAMBLE SEQUENCE TABLE |
|---|---|
| 1 | NUMBER OF ALLOCATIONS 1 TABLE |
| 01 | NUMBER OF ALLOCATIONS 2 TABLE |
| 001 | NUMBER OF ALLOCATIONS 4 TABLE |
| 0001 | NUMBER OF ALLOCATIONS 8 TABLE |
| 00001 | NUMBER OF ALLOCATIONS 16 TABLE |
| 000001 | NUMBER OF ALLOCATIONS 32 TABLE |
| 0000001 | NUMBER OF ALLOCATIONS 64 TABLE |

FIG.18

| INDEX | SEQUENCE NUMBER (r) | | | | | |
|---|---|---|---|---|---|---|
| | NUMBER OF ALLOCATED SEQUENCES 1 SEQUENCE NUMBER ALLOCATION RANGE | NUMBER OF ALLOCATED SEQUENCES 2 SEQUENCE NUMBER ALLOCATION RANGE | NUMBER OF ALLOCATED SEQUENCES 4 SEQUENCE NUMBER ALLOCATION RANGE | NUMBER OF ALLOCATED SEQUENCES 8 SEQUENCE NUMBER ALLOCATION RANGE | ... | NUMBER OF ALLOCATED SEQUENCES 64 SEQUENCE NUMBER ALLOCATION RANGE |
| 1 | 1 | | | | | |
| 2 | N-1 | | | | | |
| 3 | 2 | | | | | |
| 4 | N-2 | | | | | |
| ... | ... | | | | | |
| N-2 | (N-1)/2 | | | | | |
| N-1 | N-((N-1)/2) | | | | | |
| N | | 1, N-1 | | | | |
| N+1 | | 2, N-2 | | | | |
| ... | | ... | | | | |
| i | | (N-1)/2, N-((N-1)/2) | | | | |
| i+1 | | | 1, 2, N-1, N-2 | | | |
| i+2 | | | 3, 4, N-3, N-4 | | | |
| ... | | | ... | | | |
| j | | | | a, a2, N-a1, N-a2 | | |
| j+1 | | | | 1, 2, 3, 4, N-1, N-2, N-3, N-4 | | |
| ... | | | | | ... | |
| k | | | | | | b1,b2,...,b32, N-b1, N-b2,...,N-b32 |

FIG.19

| INDEX | SEQUENCE NUMBER (r) | u | INDEX | SEQUENCE NUMBER (r) | u |
|---|---|---|---|---|---|
| 1 | 36 | 1 | 19 | 35 | 1 |
| 2 | 18 | 2 | 20 | 24 | 2 |
| 3 | 12 | 3 | 21 | 7 | 3 |
| 4 | 9 | 4 | 22 | 5 | 4 |
| 5 | 22 | 5 | 23 | 8 | 5 |
| 6 | 6 | 6 | 24 | 20 | 6 |
| 7 | 21 | 7 | 25 | 34 | 7 |
| 8 | 23 | 8 | 26 | 27 | 8 |
| 9 | 4 | 9 | 27 | 26 | 9 |
| 10 | 11 | 10 | 28 | 33 | 10 |
| 11 | 10 | 11 | 29 | 14 | 11 |
| 12 | 3 | 12 | 30 | 16 | 12 |
| 13 | 17 | 13 | 31 | 31 | 13 |
| 14 | 29 | 14 | 32 | 15 | 14 |
| 15 | 32 | 15 | 33 | 28 | 15 |
| 16 | 30 | 16 | 34 | 25 | 16 |
| 17 | 13 | 17 | 35 | 19 | 17 |
| 18 | 2 | 18 | 36 | 1 | 18 |

FIG.22

| INDEX | SEQUENCE NUMBER (r) | u | POSITION (x) OF CORRELATION VALUE OCCURRING AT WRONG TIMING | MAXIMUM APPLICABLE CYCLIC SHIFT AMOUNT Δ VALUE | APPLICABLE CELL RADIUS |
|---|---|---|---|---|---|
| 1 | 36 | 1 | +/- 1 | 1 | SMALL ↑ |
| 2 | 18 | 2 | +/- 2 | 2 | |
| 3 | 12 | 3 | +/- 3 | 3 | |
| 4 | 9 | 4 | +/- 4 | 4 | |
| 5 | 22 | 5 | +/- 5 | 5 | |
| 6 | 6 | 6 | +/- 6 | 6 | |
| 7 | 21 | 7 | +/- 7 | 7 | |
| 8 | 23 | 8 | +/- 8 | 8 | |
| 9 | 4 | 9 | +/- 9 | 9 | ASCENDING ORDER |
| 10 | 11 | 10 | +/- 10 | 10 | |
| 11 | 10 | 11 | +/- 11 | 11 | |
| 12 | 3 | 12 | +/- 12 | 12 | |
| 13 | 17 | 13 | +/- 13 | 13 | |
| 14 | 29 | 14 | +/- 14 | 14 | |
| 15 | 32 | 15 | +/- 15 | 15 | |
| 16 | 30 | 16 | +/- 16 | 16 | |
| 17 | 13 | 17 | +/- 17 | 17 | |
| 18 | 2 | 18 | +/- 18 | 18 | ↓ LARGE |
| 19 | 35 | 19 | -/+ 18 | 18 | LARGE ↑ |
| 20 | 24 | 20 | -/+ 17 | 17 | |
| 21 | 7 | 21 | -/+ 16 | 16 | |
| 22 | 5 | 22 | -/+ 15 | 15 | |
| 23 | 8 | 23 | -/+ 14 | 14 | |
| 24 | 20 | 24 | -/+ 13 | 13 | |
| 25 | 34 | 25 | -/+ 12 | 12 | |
| 26 | 27 | 26 | -/+ 11 | 11 | |
| 27 | 26 | 27 | -/+ 10 | 10 | DESCENDING ORDER |
| 28 | 33 | 28 | -/+ 9 | 9 | |
| 29 | 14 | 29 | -/+ 8 | 8 | |
| 30 | 16 | 30 | -/+ 7 | 7 | |
| 31 | 31 | 31 | -/+ 6 | 6 | |
| 32 | 15 | 32 | -/+ 5 | 5 | |
| 33 | 28 | 33 | -/+ 4 | 4 | |
| 34 | 25 | 34 | -/+ 3 | 3 | |
| 35 | 19 | 35 | -/+ 2 | 2 | |
| 36 | 1 | 36 | -/+ 1 | 1 | ↓ SMALL |

FIG.23

| INDEX | SEQUENCE NUMBER (r) | u | POSITION (x) OF CORRELATION VALUE OCCURRING AT WRONG TIMING | MAXIMUM APPLICABLE CYCLIC SHIFT AMOUNT Δ VALUE | APPLICABLE CELL RADIUS |
|---|---|---|---|---|---|
| 1 | 36 | 1 | | | SMALL |
| 2 | 1 | 36 | +/- 1 | 1 | |
| 3 | 18 | 2 | | | |
| 4 | 19 | 35 | +/- 2 | 2 | |
| 5 | 12 | 3 | | | |
| 6 | 25 | 34 | +/- 3 | 3 | |
| 7 | 9 | 4 | | | |
| 8 | 28 | 33 | +/- 4 | 4 | |
| 9 | 22 | 5 | | | |
| 10 | 15 | 32 | +/- 5 | 5 | |
| 11 | 6 | 6 | | | |
| 12 | 31 | 31 | +/- 6 | 6 | |
| 13 | 21 | 7 | | | |
| 14 | 16 | 30 | +/- 7 | 7 | |
| 15 | 23 | 8 | | | |
| 16 | 14 | 29 | +/- 8 | 8 | |
| 17 | 4 | 9 | | | |
| 18 | 33 | 28 | +/- 9 | 9 | ASCENDING ORDER |
| 19 | 11 | 10 | | | |
| 20 | 26 | 27 | +/- 10 | 10 | |
| 21 | 10 | 11 | | | |
| 22 | 27 | 26 | +/- 11 | 11 | |
| 23 | 3 | 12 | | | |
| 24 | 34 | 25 | +/- 12 | 12 | |
| 25 | 17 | 13 | | | |
| 26 | 20 | 24 | +/- 13 | 13 | |
| 27 | 29 | 14 | | | |
| 28 | 8 | 23 | +/- 14 | 14 | |
| 29 | 32 | 15 | | | |
| 30 | 5 | 22 | +/- 15 | 15 | |
| 31 | 30 | 16 | | | |
| 32 | 7 | 21 | +/- 16 | 16 | |
| 33 | 13 | 17 | | | |
| 34 | 24 | 20 | +/- 17 | 17 | |
| 35 | 2 | 18 | | | LARGE |
| 36 | 35 | 19 | +/- 18 | 18 | |

FIG.24

SEQUENCE GENERATION METHOD AND SEQUENCE GENERATION DEVICE

TECHNICAL FIELD

The present invention relates to a sequence report method and sequence report apparatus that report a Zadoff-Chu sequence or GCL (Generalized Chirp-Like) sequence allocated to a cell.

BACKGROUND ART

In a mobile communication system typified by a cellular communication system, or a wireless LAN (Local Area Network) system, a random access field is provided in a transmission field. This random access field is provided in an uplink transmission field when a terminal station (hereinafter referred to as "UE") initially makes a connection request to a base station (hereinafter referred to as "BS"), or when a BS or the like makes a new resource allocation request in a centralized management system that allocates a UE transmission time and transmission band. A base station may also be called an access point or Node B.

With a random access burst (hereinafter referred to as "RA burst") transmitted in a random access field (hereinafter referred to as "RA slot"), unlike other scheduled channels, a reception error and retransmission occur due to a signature sequence collision (transmission of an identical signature sequence using the same RA slot by a plurality of UE's) or due to interference between signature sequences. When an RA burst collision or reception error occurs, the processing delay of RA burst uplink transmission timing synchronization acquisition and BS connection request processing increases. Consequently, there is a demand for a reduction in the signature sequence collision rate and an improvement in signature sequence detection performances.

In the mobile communication system described in Non-Patent Document 1, as an RA burst preamble (hereinafter referred to as "RA preamble") sequence, an RA preamble sequence (or signature sequence) that uses a Zadoff-Chu sequence (hereinafter referred to as "ZC sequence") or GCL sequence (Non-Patent Document 2) having a low auto-correlation characteristic and inter-sequence cross-correlation characteristic is investigated. Also, the use of a ZC-ZCZ (Zadoff-Chu Zero Correlation Zone) sequence generated by performing a cyclic shift of a ZC sequence is investigated.

With a ZC sequence and GCL sequence, an auto-correlation characteristic is optimum when its sequence number r and sequence length N satisfy a relatively prime (coprime) relationship. Also, with regard to a cross-correlation characteristic between two sequences, if the sequence numbers are designated $r_1$ and $r_2$ respectively, the cross-correlation value is constant at $\sqrt{N}$ when the absolute value of the difference between $r_1$ and $r_2$ and sequence length N satisfy a relatively prime relationship. Therefore, when sequence length N is a prime number, a set of sequences for which an auto-correlation characteristic and cross-correlation characteristic are optimum is obtained for N−1 sequences—that is, all sequences with sequence number r=1, 2, . . . , N−1.

Also, in the mobile communication system described in Non-Patent Document 1, always allocating 64 ZC-ZCZ sequences to one cell is investigated. These 64 sequences include ZC sequences with different sequence numbers and cyclic shift sequences—that is, ZC-ZCZ sequences—generated from ZC sequences having the respective sequence numbers.

The number of ZC-ZCZ sequences that can be generated from one ZC sequence depends on a cyclic shift amount between sequences. If the cyclic shift amount is designated Δ and the sequence length is designated N, the generated number of ZC-ZCZ sequences is expressed as floor(N/Δ), where floor(x) represents the largest integer that does not exceed x. To consider a time ($\Delta_{time}$) corresponding to cyclic shift amount Δ, cyclic shift amount Δ is defined by a time range in which it is possible for an RA preamble transmitted from a UE to arrive. Specifically, cyclic shift amount $\Delta_{time}$ is set so as to be greater than the sum of the maximum round-trip expected value ($T_{RoundTripDelay}$) based on the propagation delay time between a BS and UE ($T_{PropagationDelay}$) and the maximum expected value of channel multipath delay time ($T_{DelaySpread}$) ($\Delta_{time} > 2 \times T_{PropagationDelay} + T_{DelaySpread}$).

Therefore, since the propagation delay time between a BS and UE increases in proportion to the cell size (cell radius), the larger the cell size of a cell, the smaller is the number of ZC-ZCZ sequences that can be generated from one ZC sequence. Consequently, in order to allocate 64 preamble sequences to one cell, it is necessary to allocate many ZC sequences with different sequence numbers to the cell.

A BS generates a broadcast channel with sequence numbers of sequences used by a cell as allocation sequence information, and reports this to UE's present within the cell. Each UE generates an RA burst using a ZC sequence having a reported sequence number, and performs random access. A possible allocation sequence information report method is to report sequence numbers of sequences used by a cell one at a time. This method allows flexible sequence allocation since arbitrary sequence numbers are allocated to a cell.

Non-Patent Document 1: "3GPP TSG RAN; Physical Channels and Modulation (Release 8)," TS36.211V1.0.0

Non-Patent Document 2: "Generalized Chirp-Like Polyphase Sequences with Optimum Correlation Properties," Branislav M. Popovic, IEEE Transaction on Information Theory, Vol. 38, No. 4, July 1992

DISCLOSURE OF INVENTION

Problems to be Solved by the Invention

However, with the above-described allocation sequence information report method, in the case of a cell with a large cell radius it is necessary to report a maximum of 64 ZC sequences, and the broadcast channel signaling amount (number of bits) increases. Allocation sequence information is information that is required by a OE before RA preamble transmission, and is therefore transmitted robustly (that is, using a modulation method providing low-transmission-data-rate, coding rate, and so forth) so as to enable it to be received correctly even by a UE in a poor reception environment. Consequently, as the signaling amount increases, radio resources are consumed proportionally.

It is an object of the present invention to provide a sequence report method and sequence report apparatus that reduce a signaling amount for reporting a Zadoff-Chu sequence or GCL sequence allocated to a cell.

Means for Solving the Problem

A sequence report apparatus of the present invention correlates indexes having consecutive numbers to a plurality of different code sequences and allocates the indexes to cells so that the indexes are consecutive, and employs a configuration having a storage section that stores correspondence relationships that correlate indexes having consecutive numbers to a plurality of different code sequences, and a report section that reports information combining an index indicating one of the allocated code sequences and information indicating the number of allocated sequences as allocation sequence information based on the correspondence relationships.

A sequence report method of the present invention, based on correspondence relationships that correlate indexes having consecutive numbers to a plurality of different code sequences, reports, as allocation sequence information, information which combines an index indicating one of code sequences allocated to a cell such that the indexes are consecutive and information indicating the number of allocated code sequences.

Advantageous Effects of Invention

The present invention enables a signaling amount for reporting a Zadoff-Chu sequence or GCL sequence allocated to a cell to be reduced.

BRIEF DESCRIPTION OF DRAWINGS

FIG. 9 is a drawing showing correspondence relationships between sequence numbers and indexes according to Embodiment 1 of the present invention;

FIG. 15 is a drawing showing correspondence relationships between a number of cyclic shift sequences that can be generated from one sequence and a required number of allocated sequences with respect to cell size (radius);

FIG. 16 is a drawing showing correspondence relationships between sequence numbers and indexes according to Embodiment 4 of the present invention;

FIG. 18 is a drawing showing correspondence relationships between index types and preamble sequence tables according to Embodiment 4 of the present invention;

FIG. 19 is a drawing showing correspondence relationships between sequence numbers and indexes according to Embodiment 5 of the present invention;

FIG. 22 is a drawing showing correspondence relationships between sequence numbers and indexes according to Embodiment 6 of the present invention;

FIG. 23 is a drawing showing correspondence relationships between sequence numbers and indexes according to Embodiment 6 of the present invention; and FIG. 24 is a drawing showing correspondence relationships between sequence numbers and indexes according to Embodiment 6 of the present invention.

BEST MODE FOR CARRYING OUT THE INVENTION

Now, embodiments of the present invention will be described in detail with reference to the accompanying drawings.

(Embodiment 1)

First, a ZC sequence will be shown using equations. A ZC sequence of sequence length N is represented by Equation (1) when N is an even number, and by Equation (2) when N is an odd number.

(Equation 1)
$$c_r(k) = \exp\left\{-j\frac{2\pi r}{N}\left(\frac{k^2}{2} + qk\right)\right\} \quad [1]$$

(Equation 2)
$$c_r(k) = \exp\left\{-j\frac{2\pi r}{N}\left(\frac{k(k+1)}{2} + qk\right)\right\} \quad [2]$$

Here, k=0, 1, 2, . . . , N−1; q is an arbitrary integer; r is a sequence number (Sequence index); and r has a mutually prime relationship with N, and is a positive integer smaller than N.

Next, a GCL sequence will be shown using equations. A GCL sequence of sequence length N is represented by Equation (3) when N is an even number, and by Equation (4) when N is an odd number.

(Equation 3)
$$c_{r,m}(k) = \exp\left\{-j\frac{2\pi r}{N}\left(\frac{k^2}{2} + qk\right)\right\}b_i(k \bmod m) \quad [3]$$

(Equation 4)
$$c_{r,m}(k) = \exp\left\{-j\frac{2\pi r}{N}\left(\frac{k(k+1)}{2} + qk\right)\right\}b_i(k \bmod m) \quad [4]$$

Here, k=0, 1, 2, N−1; q is an arbitrary integer; r has a mutually prime relationship with N, and is an integer smaller than N; $b_i(k \bmod m)$ is an arbitrary complex number, and i=0, 1, . . . , m−1. Also, when minimizing cross-correlation between GCL sequences, an amplitude 1 arbitrary complex number is used for $b_i(k \bmod m)$.

A GCL sequence is a sequence resulting from multiplying a ZC sequence by $b_i(k \bmod m)$, and since receiving-side correlation computation is similar to that for a ZC sequence, a ZC sequence will be taken as an example in the following description. A case will be described below in which a ZC sequence for which sequence length N is an odd number and a prime number is used as an RA burst preamble sequence.

Figure 1:
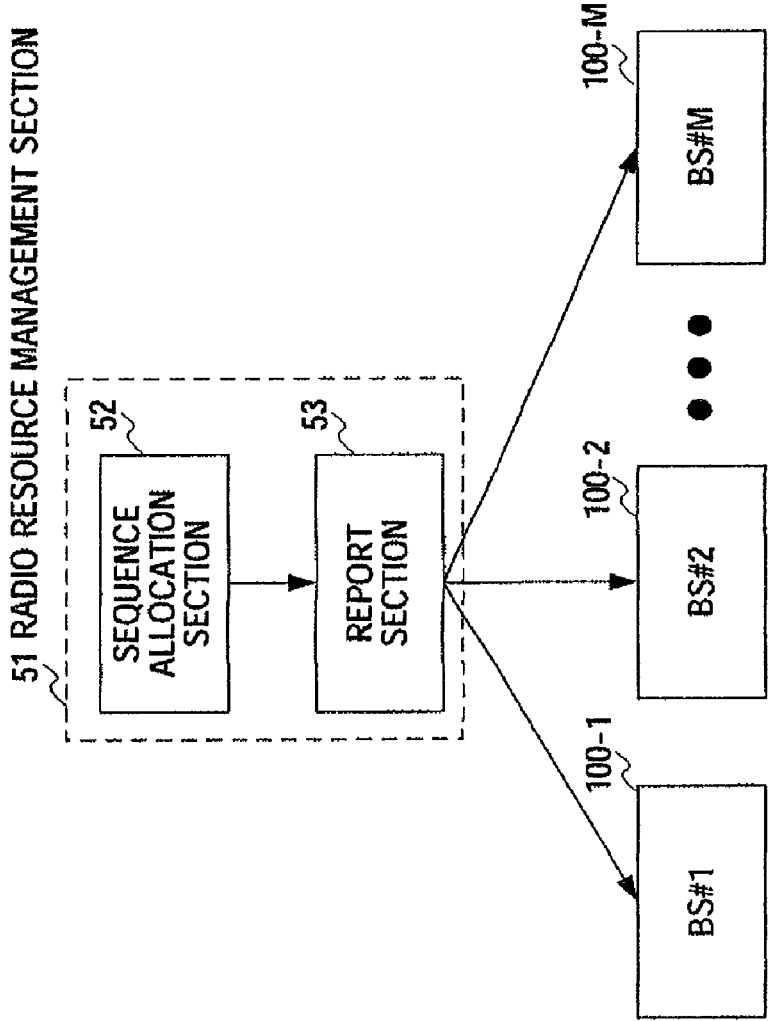
FIG. 1 is a block diagram showing a configuration of a wireless communication system according to Embodiment 1 of the present invention.

FIG. 1 is a block diagram showing a configuration of a wireless communication system according to Embodiment 1 of the present invention. In this figure, radio resource management section 51 manages radio resources allocated to plurality of BS's (#1 through #M) 100-1 through 100-M, and is equipped with sequence allocation section 52 and report section 53.

Sequence allocation section 52 allocates ZC sequence number r to a cell managed by a subordinate BS, and outputs allocated sequence number r to report section 53. Report section 53 reports information indicating sequence number r output from sequence allocation section 52 to plurality of BS's 100-1 through 100-M. Details of sequence allocation section 52 and report section 53 will be given later herein.

Based on information indicating sequence number r reported from report section 53, BS's 100-1 through 100-M report allocation sequence information to a UE within their own cell by means of a report method described later herein, and detects a preamble sequence transmitted from the UE. Since BS's 100-1 through 100-M all have identical functions, they will be treated collectively as BS 100 in the following description.

Figure 2:
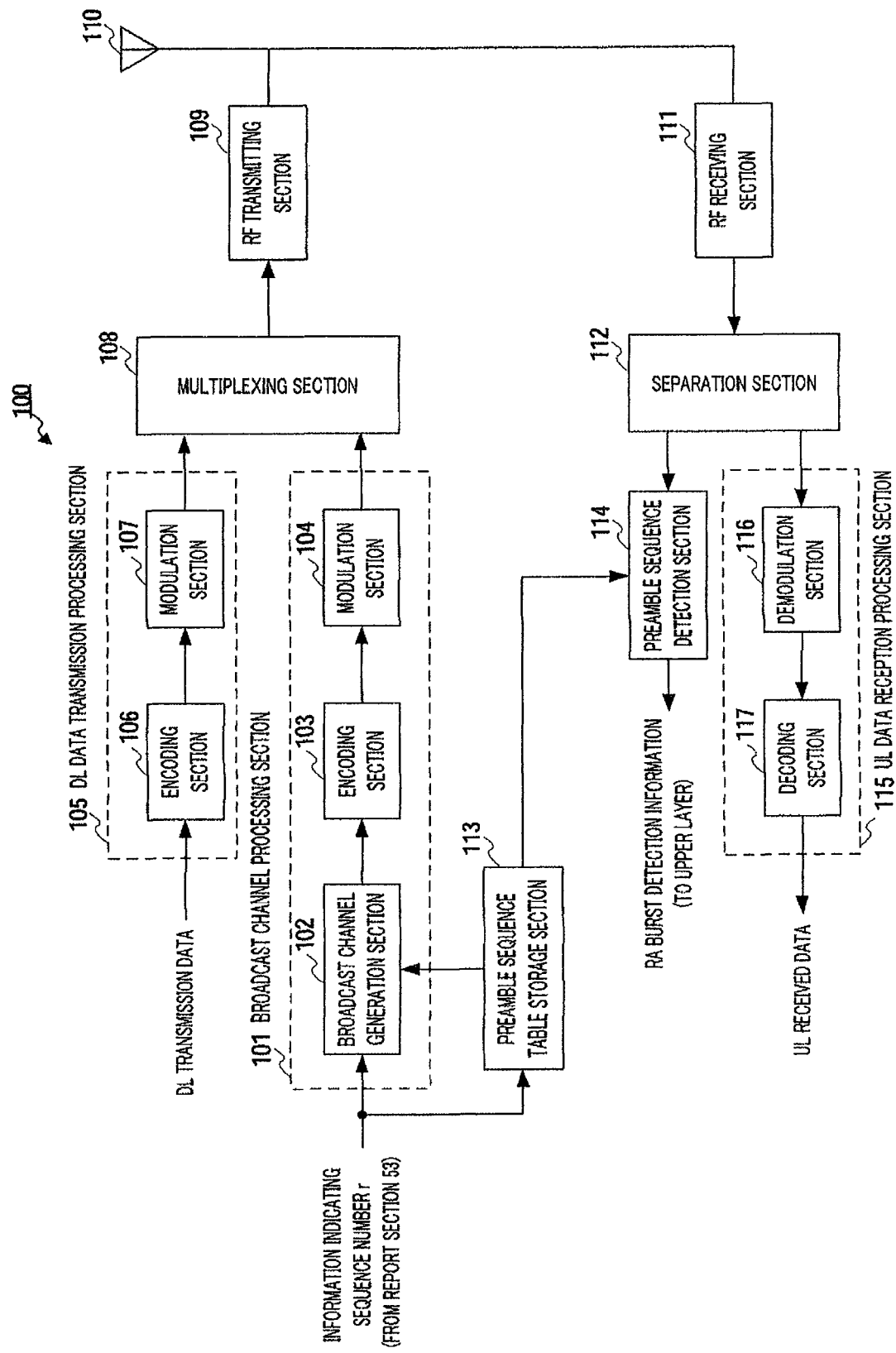
FIG. 2 is a block diagram showing a configuration of a BS shown in FIG. 1.

FIG. 2 is a block diagram showing the configuration of BS 100 shown in FIG. 1. In this figure, broadcast channel processing section 101 is equipped with broadcast channel generation section 102, encoding section 103, and modulation section 104. Based on information indicating allocation sequence number r reported from report section 53 shown in FIG. 1, broadcast channel generation section 102 reads corresponding information from preamble sequence table storage section 113 and generates a broadcast channel that is a downlink control channel including the read information. The generated broadcast channel is output to encoding section 103.

Encoding section 103 encodes the broadcast channel output from broadcast channel generation section 102, and modulation section 104 modulates the encoded broadcast channel using a modulation method such as BPSK or QPSK. The modulated broadcast channel is output to multiplexing section 108.

DL data transmission processing section 105 is equipped with encoding section 106 and modulation section 107, and performs DL transmission data transmission processing. Encoding section 106 encodes DL transmission data, and modulation section 107 modulates encoded DL transmission data using a modulation method such as BPSK or QPSK, and outputs the modulated DL transmission data to multiplexing section 108.

Multiplexing section 108 performs time multiplexing, frequency multiplexing, spatial multiplexing, or code multiplexing of the broadcast channel output from modulation section 104 and the DL transmission data output from modulation section 107, and outputs a multiplex signal to RF transmitting section 109.

RF transmitting section 109 executes predetermined radio transmission processing such as D/A conversion, filtering, and up-conversion on the multiplex signal output from multiplexing section 108, and transmits a signal that has undergone radio transmission processing from antenna 110.

RF receiving section 111 executes predetermined radio reception processing such as down-conversion and A/D conversion on a signal received via antenna 110, and outputs a signal that has undergone radio reception processing to separation section 112.

Separation section 112 separates the signal output from RF receiving section 111 into an RA slot and a UL data slot, and outputs the separated RA slot to preamble sequence detection section 114, and the separated UL data slot to demodulation section 116 of UL data reception processing section 115.

Preamble sequence table storage section 113 stores a preamble sequence table correlating preamble sequences that can be allocated by sequence allocation section 52 shown in FIG. 1, corresponding sequence numbers, and indexes indicating these sequence numbers, reads a preamble sequence from the table based on information indicating allocation sequence number r reported from report section 53 shown in FIG. 1, and outputs the relevant preamble sequence to preamble sequence detection section 114.

Preamble sequence detection section 114 performs correlation processing and suchlike preamble waveform detection processing for an RA slot output from separation section 112 using a preamble sequence stored in preamble sequence table storage section 113, and detects whether or not a preamble sequence has been transmitted from a UE. The detection result (RA burst detection information) is output to an upper layer not shown in the figure.

UL data reception processing section 115 is equipped with demodulation section 116 and decoding section 117, and performs UL data reception processing. Demodulation section 116 performs channel response distortion correction for UL data output from separation section 112, and performs signal point determination by means of a hard decision or soft decision corresponding to the modulation method, and decoding section 117 performs error correction processing for the result of signal point determination by demodulation section 116, and outputs UL received data.

Figure 3:
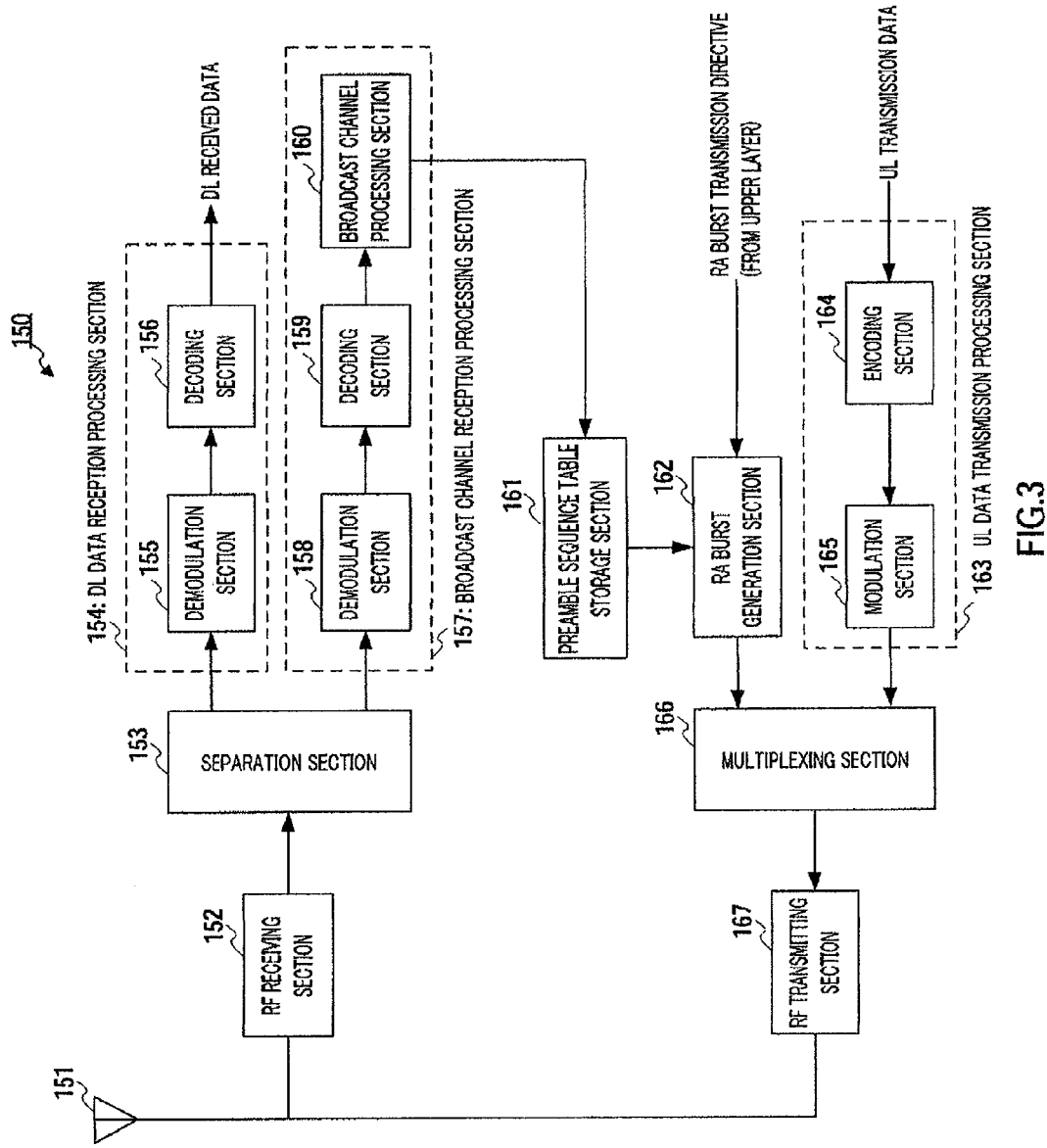
FIG. 3 is a block diagram showing a configuration of a UE according to Embodiment 1 of the present invention.

FIG. 3 is a block diagram showing the configuration of UE 150 according to Embodiment 1 of the present invention. In this figure, RF receiving section 152 receives a signal transmitted from BS 100 shown in FIG. 1 via antenna 151, executes predetermined radio reception processing such as down-conversion and A/D conversion on the received signal, and outputs a signal that has undergone radio reception processing to separation section 153.

Separation section 153 separates a broadcast channel and DL data included in the signal received from RF receiving section 152, and outputs the separated DL data to demodulation section 155 of DL data reception processing section 154, and the separated broadcast channel to demodulation section 158 of broadcast channel reception processing section 157.

DL data reception processing section 154 is equipped with demodulation section 155 and decoding section 156, and performs DL data reception processing. Demodulation section 155 performs channel response distortion correction of DL data output from separation section 153, and performs signal point determination by means of a hard decision or soft decision corresponding to the modulation method, and decoding section 156 performs error correction processing for the result of signal point determination by demodulation section 155, and outputs DL received data.

Broadcast channel reception processing section 157 is equipped with demodulation section 158, decoding section 159, and broadcast channel processing section 160, and performs broadcast channel reception processing. Demodulation section 158 performs channel response distortion correction of a broadcast channel output from separation section 153, and performs signal point determination by means of a hard decision or soft decision corresponding to the modulation method, and decoding section 159 performs error correction processing for the result of broadcast channel signal point determination by demodulation section 158. A broadcast channel that has undergone error correction processing is output to broadcast channel processing section 160. Broadcast channel processing section 160 outputs allocation sequence information included in the broadcast channel output from decoding section 159 to preamble sequence table storage section 161, and outputs another broadcast channel to an upper layer not shown in the figure.

Preamble sequence table storage section 161 stores a preamble sequence table possessed by preamble sequence table storage section 113 of BS 100 shown in FIG. 2—that is, a preamble sequence table correlating preamble sequences that can be allocated by sequence allocation section 52 shown in FIG. 1, corresponding sequence numbers, and indexes indicating these sequence numbers. Then a preamble sequence corresponding to allocation sequence information output from broadcast channel processing section 160 is output to RA burst generation section 162.

On acquiring an RA burst transmission directive from an upper layer not shown in the figure, RA burst generation section 162 selects one usable preamble sequence from preamble sequence table storage section 161, generates an RA burst including the selected preamble sequence, and outputs the generated RA burst to multiplexing section 166.

UL data transmission processing section 163 is equipped with encoding section 164 and modulation section 165, and performs UL data transmission processing. Encoding section 164 encodes UL transmission data, and modulation section 165 modulates encoded UL transmission data using a modulation method such as BPSK or QPSK, and outputs the modulated UL transmission data to multiplexing section 166.

Multiplexing section 166 multiplexes the RA burst output from RA burst generation section 162 and the UL transmission data output from modulation section 165, and outputs a multiplex signal to RF transmitting section 167.

RF transmitting section 167 executes predetermined radio transmission processing such as D/A conversion, filtering, and up-conversion on the multiplex signal output from multiplexing section 166, and transmits a signal that has undergone radio transmission processing from antenna 151.

Figure 4:
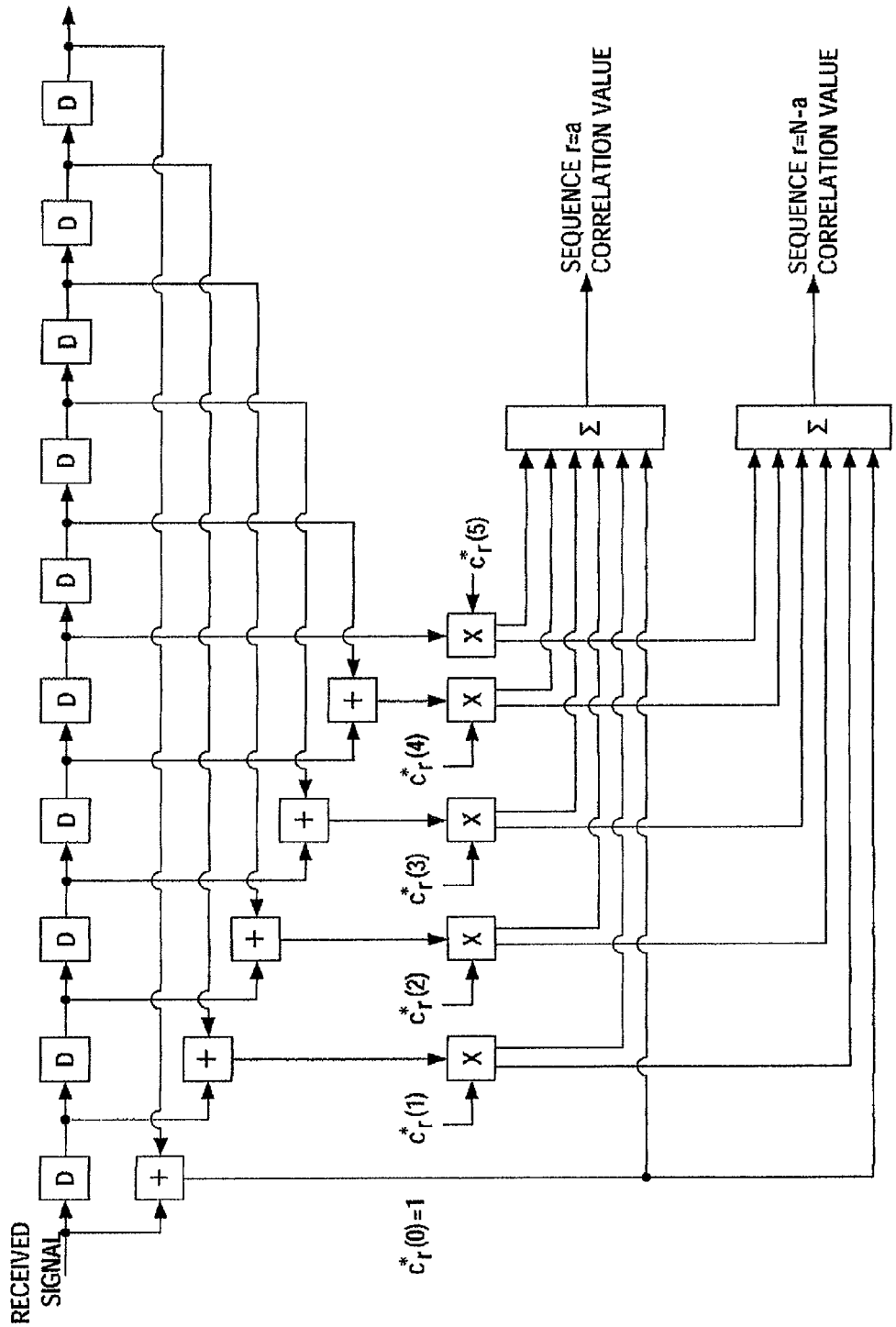
FIG. 4 is a drawing showing an internal configuration of the preamble sequence detection section shown in FIG. 2.

Next, preamble sequence detection section 114 shown in FIG. 2 will be described. FIG. 4 is a drawing showing the internal configuration of preamble sequence detection section 114 shown in FIG. 2. A case is shown here by way of example in which sequence length N=11, and a pair of sequence number r=a and sequence number r=N−a ZC sequences are allocated as a preamble sequence, where a represents an arbitrary sequence number that sequence number r can be.

In FIG. 4, if an input signal from delay device D is designated $r(k)=a_k+jb_k$, and each coefficient of a sequence number r=a ZC sequence is designated $c_{r=a}*(k)=c_k+jd_k$, then for complex multiplication section x, a computation result for sequence number r=a side correlation is $a_k c_k - b_k d_k + j(b_k c_k + a_k d_k)$. On the other hand, each coefficient of a sequence number r=N−a ZC sequence is $c_{r=N-a}*(k)=(a_{r=a}*(k))*=c_k-jd_k$, and a computation result for sequence number r=N−a side correlation is $a_k c_k + b_k d_k + j(b_k c_k - a_k d_k)$.

Therefore, as the result of multiplication computation performed to obtain a sequence number r=a side correlation value, $a_k c_k$, $b_k d_k$, $b_k c_k$, and $a_k d_k$ can be used for calculation of a sequence number r=N−a side correlation value, the multiplication computation amount can be reduced compared with reception processing when sequence number r=a and sequence number r=N−a are not allocated as a pair, and the circuit scale (number of multipliers) can be reduced.

Also, as can be seen from FIG. 4, one ZC sequence has a relationship with an even object sequence (sequence elements being $c_r(k)=c_r(N-1-k)$), and therefore the number of multiplications (number of multipliers) can be further reduced by performing multiplication processing whereby k and N−1−k elements are added prior to multiplication computation by a correlator.

Next, an actual method of reporting allocation sequence information will be described.

Figures 5, 6:
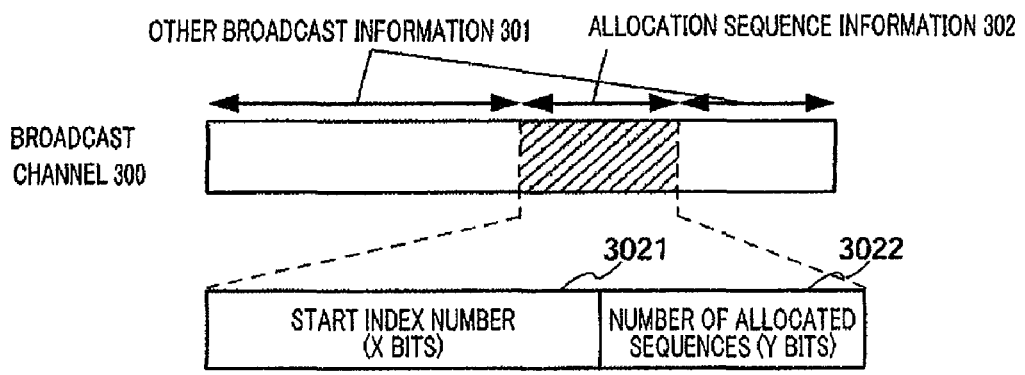
FIG. 5 is a drawing showing correspondence relationships between sequence numbers and indexes according to Embodiment 1 of the present invention.
FIG. 6 is a drawing showing a configuration of a broadcast channel according to Embodiment 1 of the present invention.

FIG. 5 is a drawing showing a preamble sequence table according to Embodiment 1 of the present invention. In FIG. 5, sequence number r=1 is correlated to index 1 and sequence number r=N−1 to index 2, and sequence number r=2 is correlated to index 3 and sequence number r=N−2 to index 4. The same kind of sequence number r correlation also applies from index 5 onward.

When sequence numbers are allocated to cells by sequence allocation section 52 shown in FIG. 1, necessary number-of-sequences-K ZC sequences are allocated to each cell in accordance with the table shown in FIG. 5 so that indexes are consecutive. Information indicating sequence number r of allocated sequences is reported to report section 53.

Report section 53 reports a ZC sequence allocated by sequence allocation section 52 to BS 100 that is the allocation object. Broadcast channel generation section 102 of BS 100 generates a broadcast channel (BCH) including allocation sequence information reported from report section 53.

FIG. 6 is a drawing showing the configuration of broadcast channel 300 generated by broadcast channel generation section 102. Broadcast channel generation section 102 references preamble sequence table storage section 113 storing the table shown in FIG. 5, and generates allocation sequence information 302 combining start index number 3021 indicating an index correlated to the first index number of consecutively allocated ZC sequences and number of allocated sequences 3022 indicating the allocated number of ZC sequences. Allocation sequence information 302 is included in broadcast channel 300, and is reported to each UE.

Here, number of bits X of start index number 3021 is a number of bits necessary to report a ZC sequence number, and when the number of sequences is N−1, X=ceiling($\log_2$(N−1)). Also, number of bits Y of number of allocated sequences 3022 is a number of bits necessary to report the maximum number of allocations that can be made to one cell, M, where Y=ceiling($\log_2$(M)). Here, ceiling(x) represents x when x is an integer, and represents the smallest integer among integers larger than x when x is a non-integer value.

One index number and a number of allocated sequences decided in this way are reported to UE 150 from BS 100 by means of a broadcast channel. On the UE 150 side, also, a table identical to the table shown in FIG. 5 is provided in preamble sequence table storage section 161, and usable sequence numbers are identified using the reported single index number and number of allocated sequences. UE 150 selects one sequence number from among the identified usable sequence numbers, generates an RA burst including a preamble sequence, and transmits this in an RA slot.

FIG. 6 shows an example in which an index number at the start of allocated sequences is reported, but an index number at the end, or at a specific position decided beforehand among radio resource management section 51, BS 100, and UE 150, may also be used.

Figure 7:
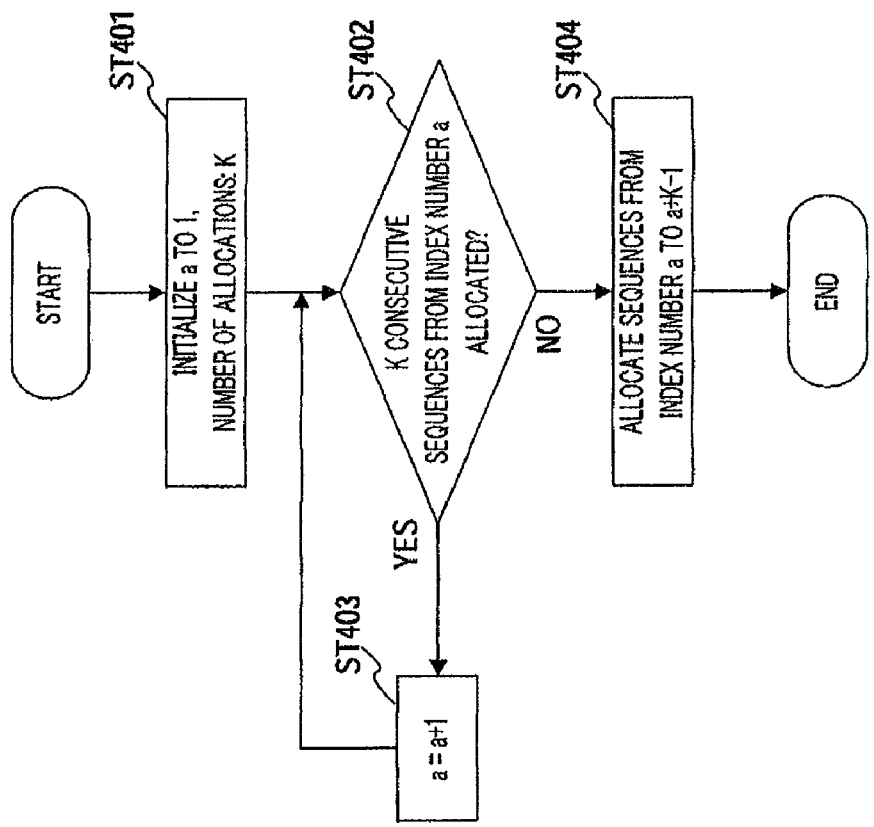
FIG. 7 is a flowchart showing the operation of the sequence allocation section shown in FIG. 1.

Next, the operation of sequence allocation section 52 shown in FIG. 1 will be described using FIG. 7. In step (hereinafter abbreviated to "ST") 401 in FIG. 7, counter a is initialized (a=1), and the number of allocations to one cell is set to K.

In ST402, it is determined whether or not even one of K consecutive sequences from index number a to index number a+K−1 has been allocated. If none has been allocated (NO) —that is, if all K sequences are available for allocation—the processing flow proceeds to ST404 in order to perform sequence allocation, whereas if even one of the K consecutive sequences has been allocated (YES), counter a is incremented (a=a+1) in ST403, and the processing flow returns to ST402.

In ST404, sequences from index number a to index number a+K−1 are allocated, and sequence allocation processing is terminated. In ST401, ST402, and ST404, allocated sequences are shown as being searched for in ascending sequence number order, but the search order (counter a order) is not limited to this.

Figure 8:
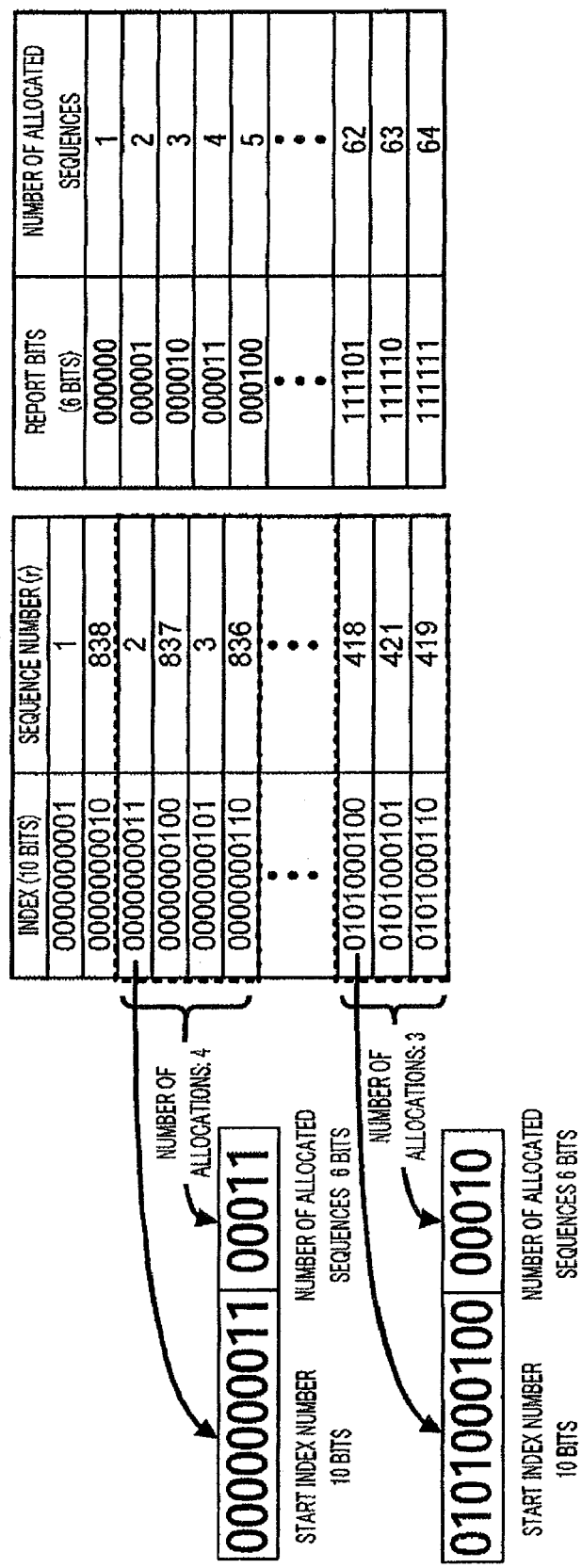
FIG. 8 is a drawing showing a configuration of allocation sequence information according to Embodiment 1 of the present invention.

FIG. 8 shows the configuration of a preamble sequence table and broadcast channel allocation sequence information when ZC sequence length N=839 and the maximum number of sequences that can be allocated to one cell is 64.

Since sequence length N is prime number 839, the number of sequences that can be allocated is 838, and the number of indexes is also 838. Therefore, the number of bits necessary for an index number report is 10. Also, since the number of allocations is 1 to 64 (maximum), the number of bits necessary for a number-of-allocated-sequences report is six. Therefore, the number of bits necessary for reporting an allocated sequence number and number of sequences is always 16.

On the other hand, when arbitrary sequence numbers are allocated to one cell, assuming that 10 bits are needed for an index report for each allocated sequence and the maximum number of allocated sequences is 64, a maximum of 640 bits (=10 bits×64 sequences) are necessary, and therefore application of the report method of Embodiment 1 enables the number of signaling bits to be reduced from a maximum of 640 to 16, enabling the signaling amount to be reduced by a maximum of 97.5%.

Thus, according to Embodiment 1, the signaling overhead of allocation sequence information reported by a broadcast channel can be reduced. Also, since a fixed size is used irrespective of the number of allocated sequences, the number of bits of allocation sequence information can be kept constant irrespective of the number of allocated sequences, enabling the size of a broadcast channel to be fixed, and transmission/reception processing configurations to be simplified.

With regard to a method of reporting allocation sequence information to BS's 100-1 through 100-M from report section 53, also, the signaling amount can be reduced by reporting in the same way as with the method of reporting from BS 100 to UE 150.

In this embodiment, a case has been described in which sequence length N is a prime number (odd number), but sequence length N may also be a non-prime number (either odd or even). If sequence length N is a non-prime number, sequence number r having an optimum auto-correlation characteristic that is usable throughout the entire system must satisfy the condition of being mutually prime with respect to sequence length N.

As shown in FIG. 9, in a table stored in preamble sequence table storage section 113, (a, N−a) pairs may be randomly arranged. The order of a ZC sequence pair (the a, N−a order) may be either a, N−a or N−a, a.

Also, in a table stored in preamble sequence table storage section 113, the ZC sequence number order (sequence number a order) may be arbitrary, may be a=1, 2, 3, 4, . . . , or may be a random allocation such as a=11, (N−1)/2, 1, . . . or the like. When such a preamble sequence table is used, as long as BS 100 and UE 150 share the same table, the signaling amount can be reduced in a similar way by reporting index numbers correlated to sequence numbers shown in the table and the number of allocated sequences.

In this embodiment, a preamble sequence used in random access has been described as an example, but the present invention is not limited to this, and can also be applied to a case in which a plurality of ZC sequences or GCL sequences are used by one BS as a known signal. Examples of such a known signal include a channel estimation reference signal, a downlink synchronization pilot signal (Synchronization channel), or the like.

Figure 10:
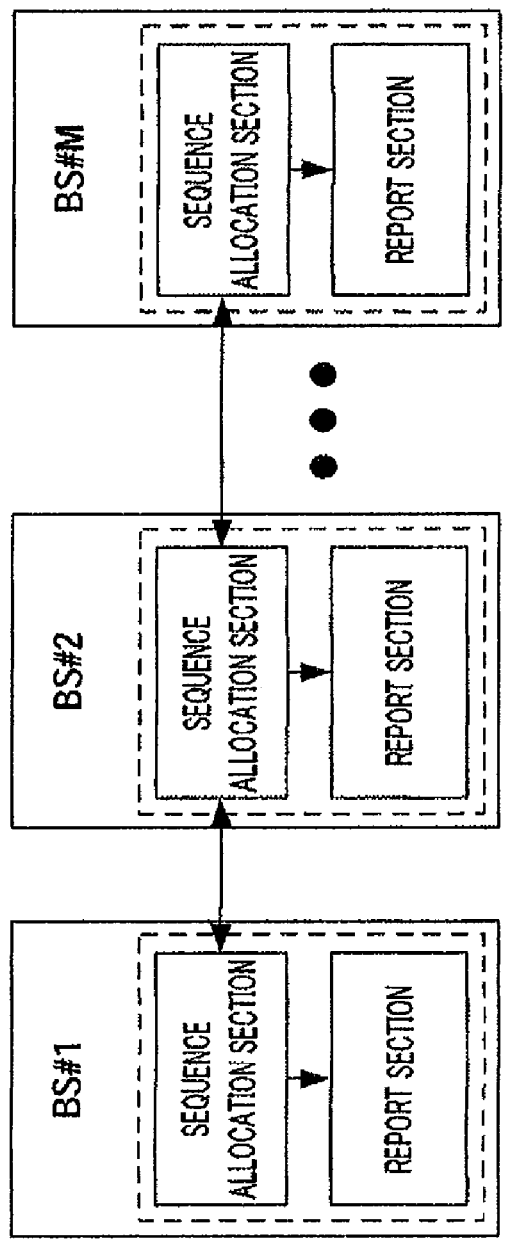
FIG. 10 is a block diagram showing a distributed management type system configuration.

In this embodiment, a centralized management type system configuration has been described in which there is one sequence allocation section 52 for a plurality of BS's, as shown in FIG. 1, but a distributed management type system configuration may also be used in which a sequence allocation section is provided for each BS and information exchange is performed among a plurality of BS's so that ZC sequences with mutually different sequence numbers r are allocated, as shown in FIG. 10.

(Embodiment 2)

The configurations of a radio resource management section, BS, and UE according to Embodiment 2 of the present invention are similar to the configurations shown in FIG. 1, FIG. 2, and FIG. 3 in Embodiment 1, and therefore FIG. 1, FIG. 2, and FIG. 3 will be used in the following description.

Figures 11, 12:
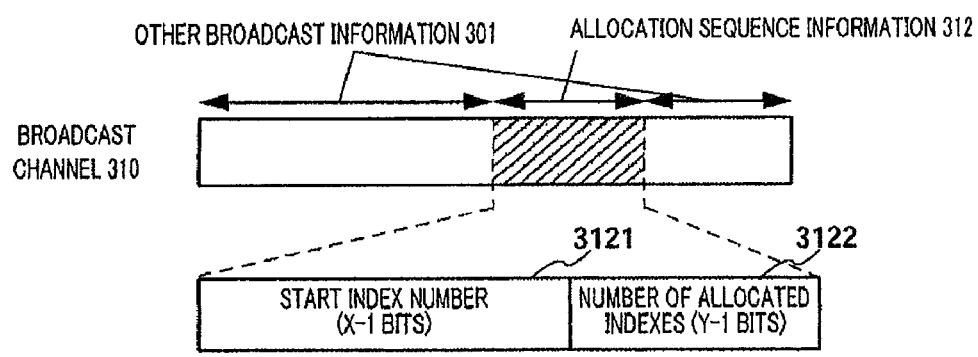
FIG. 11 is a drawing showing correspondence relationships between sequence numbers and indexes according to Embodiment 2 of the present invention.
FIG. 12 is a drawing showing a configuration of a broadcast channel according to Embodiment 2 of the present invention.

FIG. 11 is a drawing showing a preamble sequence table according to Embodiment 2 of the present invention. In FIG. 11, sequence numbers r=1, N−1 are correlated to index 1, and sequence numbers r=2, N−2 are correlated to index 2. The same kind of sequence number r correlation also applies from index 3 onward.

When sequence numbers are allocated to cells by sequence allocation section 52, necessary number-of-sequences-K ZC sequences are allocated to each cell in accordance with the table shown in FIG. 11 so that indexes are consecutive. Indexes of allocated sequences are reported to report section 53.

Report section 53 reports an index of a sequence allocated by sequence allocation section 52 to BS 100 that is the allocation object. Broadcast channel generation section 102 of BS 100 generates allocation sequence information based on an index reported from report section 53, Allocation sequence information is included in a broadcast channel.

FIG. 12 is a drawing showing the configuration of broadcast channel 310 generated by broadcast channel generation section 102. Broadcast channel generation section 102 references preamble sequence table storage section 113 storing the table shown in FIG. 11, and generates allocation sequence information 312 combining start index number 3121 and number of allocated ZC sequence indexes 3122 indicating the number indexes of allocated ZC sequences. Allocation sequence information 312 is included in broadcast channel 310, and is reported to each UE.

In this embodiment, two sequence numbers are correlated to one index, and therefore the number of bits necessary to report the number of indexes is X−1. Also, when the maximum number of indexes is M, the number of indexes for which allocation is performed is M/2, and therefore the number of bits necessary to report the number of allocated indexes is Y−1.

Here, number of bits X−1 of start index number 3121 and number of bits Y−1 of number of allocated indexes 3122 are defined in the same way as in Embodiment 1. That is to say, X is a number of bits necessary to represent a ZC sequence number, and when the number of sequences is N−1, X−1=ceiling($\log_2(N-1)$)−1. Also, number of bits Y is a number of bits necessary to report the maximum number of allocations that can be made to one cell, M, where Y−1=ceiling ($\log_2(M)$)−1.

One index number and a number of allocated indexes decided in this way are reported to UE 150 from BS 100 by means of a broadcast channel. On the UE 150 side, also, a table identical to the table shown in FIG. 11 is provided in preamble sequence table storage section 161, and usable sequence numbers are identified using the reported single index number and number of allocated sequences. UE 150 selects one sequence number from among the identified usable sequence numbers, generates an RA burst including a preamble sequence, and transmits this in an RA slot.

FIG. 12 shows an example in which an index number at the start of allocated sequences is reported, but an index number at the end, or at a specific position decided beforehand among radio resource management section 51, BS 100, and UE 150, may also be used.

The effect of the above allocation sequence information report method when ZC sequence length N=839, the number of sequences is 838, and the maximum number of sequences that can be allocated to one cell is 64, is described below.

Since sequence length N is prime number 839, the number of sequences that can be allocated is 838, and the number of indexes is also 838. Since an index number is assigned to a pair of sequence numbers a, N−a, the number of bits necessary for an index number report is nine. Also, since the number of indexes is 1 to 32 (maximum), the number of bits necessary for a number-of-allocated-indexes report is five. Therefore, the number of bits necessary for reporting an allocated sequence number and number of sequences is always 14.

On the other hand, when arbitrary sequence numbers are allocated to one cell, assuming that 10 bits are needed for an index report for each allocated sequence and the maximum number of allocated sequences is 64, a maximum of 640 bits (=10 bits×64 sequences) are necessary, and therefore application of the report method of Embodiment 2 enables the number of signaling bits to be reduced from a maximum of 640 to 14, enabling the signaling amount to be reduced by a maximum of 97.8%.

Thus, according to Embodiment 2, the signaling overhead of allocation sequence information reported by a broadcast channel can be further reduced while reducing the amount of computation of ZC sequence correlation processing.

In this embodiment, a case has been described in which one index is correlated to a pair of sequence numbers (a, N−a), but one index may also be correlated to a set of more than two sequence numbers, such as a set of four sequence numbers ($a_1$, N−$a_1$, $a_2$, N−$a_2$), a set of eight sequence numbers ($a_1$, N−$a_1$, $a_2$, N−$a_2$, $a_3$, N−$a_3$, $a_4$, N−$a_4$), and so forth.

As in Embodiment 1, in a table stored in preamble sequence table storage section 113, (a, N−a) pairs may be randomly arranged. The order of a ZC sequence pair (the a, N−a order) may be either a, N−a or N−a, a. Also, one index may be correlated to a random set of ZC sequences, such as (1, 3), (2, N−4), (a, N−b), rather than using an (a, N−a) pair.

(Embodiment 3)

The configurations of a radio resource management section, BS, and UE according to Embodiment 3 of the present invention are similar to the configurations shown in FIG. 1, FIG. 2, and FIG. 3 in Embodiment 1, and therefore FIG. 1, FIG. 2, and FIG. 3 will be used in the following description.

Also, a preamble sequence table according to Embodiment 3 of the present invention is identical to the preamble sequence table shown in FIG. 5 in Embodiment 1, but differs from Embodiment 1 in that the number of sequences allocated to a cell is limited.

Figures 13, 14:
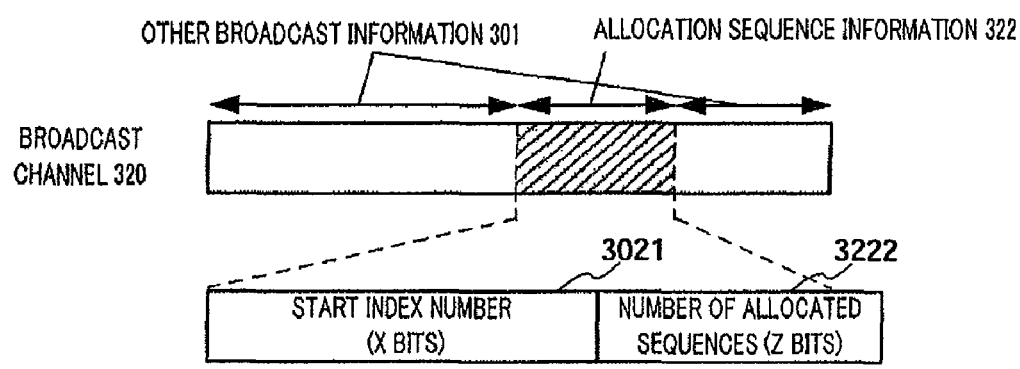
FIG. 13 is a drawing showing correspondence relationships between numbers of allocated sequences and report bits according to Embodiment 3 of the present invention.
FIG. 14 is a drawing showing a configuration of a broadcast channel according to Embodiment 3 of the present invention.

FIG. 13 is a drawing showing correspondence relationships between numbers of allocated sequences and report bits according to Embodiment 3 of the present invention. FIG. 13 shows a case in which the maximum number of allocated sequences is 64, and the number of sequences that can be allocated to a cell is limited to a power of two. The reason why the number of allocated sequences can be limited will be explained later herein.

When ZC sequence numbers are allocated to cells by sequence allocation section 52, necessary number-of-sequences-K ZC sequences are allocated to each cell in accordance with the table shown in FIG. 5 so that indexes are consecutive (the same as in FIG. 8). Here, possible values of number of sequences K are limited to the values shown in FIG. 13. Indexes of allocated sequences are reported to report section 53.

FIG. 14 is a drawing showing the configuration of broadcast channel 320 generated by broadcast channel generation section 102. Broadcast channel generation section 102 references preamble sequence table storage section 113 storing the tables shown in FIG. 5 and FIG. 13, and generates allocation sequence information 322 combining start index number 3021 and number of allocated sequences 3222 of allocated ZC sequences. Allocation sequence information 322 is included in broadcast channel 320, and is reported to each UE.

Here, number of bits Z of number of allocated sequences 3222 is a number of bits necessary for report bits, and when possible numbers of sequences are of P kinds, Z=ceiling($\log_2$(P)). Also, in the case of the numbers of allocated sequences (seven kinds) shown in FIG. 13, number of bits Z is three.

One index number and a number of allocated sequences decided in this way are reported to UE 150 from BS 100 by means of a broadcast channel. On the UE 150 side, also, tables identical to the tables shown in FIG. 5 and FIG. 13 are provided in preamble sequence table storage section 161, and usable sequence numbers are identified using the reported single index number and number of allocated sequences. UE 150 selects one sequence number from among the identified usable sequence numbers, generates an RA burst including a preamble sequence, and transmits this in an RA slot.

FIG. 14 shows an example in which an index number at the start of allocated sequences is reported, but an index number at the end, or at a specific position decided beforehand among radio resource management section 51, BS 100, and UE 150, may also be used.

The reason why it is possible to limit the number of allocated sequences will now be explained using FIG. 15.

FIG. 15 is a drawing showing the relationship between a number of cyclic shift sequences that can be generated from one ZC sequence and a required number of allocated sequences with respect to the cell size (cell radius) in the case of an 800 μs RA preamble length. Here, a required number of allocated sequences is a number of ZC sequences with different sequence numbers.

As an example, in the mobile communication system described in Non-Patent Document 1, 64 random access preamble sequences are always used for one cell. At this time, 64 sequences comprise one or a plurality of cyclic shift sequences generated from one ZC sequence and ZC sequences with different sequence numbers. If it is possible for eight cyclic shift sequences to be generated from one ZC sequence, a total of 64 sequences are obtained by allocating eight ZC sequences with different sequence numbers and generating eight cyclic shift sequences from each ZC sequence.

An equation for which q=0 for a ZC sequence (Equation (2)) when the sequence length is an odd number and that includes cyclic shift amount Δ is shown in Equation (5).

(Equation 5)

$$c_{r,l}(k) = \exp\left\{-j\frac{2\pi r}{N}\left(\frac{k(k+1\Delta)(k+l\Delta+1)}{2}\right)\right\}$$ [5]

where l represents a cyclic shift sequence number, l=0, 1, . . . , L−1, and L represents a number of cyclic shift sequences.

The number of cyclic shift sequence that can be generated from one ZC sequence is defined by cyclic shift amount Δ. When Δ is small, the number of cyclic shift sequences that can be generated from one sequence increases, and when Δ is large, the number of cyclic shift sequences that can be generated from one sequence decreases. Number of cyclic shift sequences L is obtained from the equation L=floor(N/Δ).

Furthermore, cyclic shift amount Δ must be set so as to be greater than round-trip propagation delay (Round trip delay) between BS 100 and UE 150, and is therefore proportional to the service radius supported by a cell. Therefore, as shown in FIG. 15, the number of cyclic shift sequence that can be generated from one sequence decreases, while the required number of allocated sequences increases, in proportion to the cell size (cell radius).

With regard to the number of allocated sequences, the configuration in Embodiment 1 allows an arbitrary number from 1 to maximum number of allocations M to be allocated, but in the case of a large number of allocated sequences (for example, 17 to 31, 33 to 63, or the like) a cell has an extremely large cell radius, and such numbers are actually almost never used. On the other hand, most cells have a cell radius of from several hundred meters to 10 km or so, and for such cells the required number of allocated sequences is small.

Therefore, by widening (exponentially increasing) the interval between possible numbers of sequences as the cell radius increases, as shown in FIG. 15, it is possible to reduce the signaling amount while maintaining a certain degree of freedom of sequence allocation.

The effect of the above allocation sequence information report method when ZC sequence length N=839, the number of sequences is 838, the maximum number of sequences that can be allocated to one cell is 64, and the number of allocated sequences is limited as shown in FIG. 13, is described below.

Since sequence length N is prime number 839, the number of sequences that can be allocated is 838, and the number of indexes is also 838. The number of bits necessary for an index number report is 10, as in Embodiment 1. Also, the number of bits necessary for a number-of-allocated-indexes report is three. Therefore, the number of bits necessary for reporting an allocated sequence number and number of sequences is always 13.

When arbitrary sequence numbers are allocated to one cell, assuming that 10 bits are needed for an index report for each allocated sequence and the maximum number of allocated sequences is 64, a maximum of 640 report bits (=10 bits×64 sequences) are necessary, and therefore application of the report method of Embodiment 3 enables the number of signaling bits to be reduced from a maximum of 640 to 13, enabling the signaling amount to be reduced by a maximum of 98.0%.

Thus, according to Embodiment 3, the signaling overhead of allocation sequence information reported by a broadcast channel can be further reduced while reducing the amount of computation of ZC sequence correlation processing.

(Embodiment 4)

The configurations of a radio resource management section, BS, and UE according to Embodiment 4 of the present invention are similar to the configurations shown in FIG. 1, FIG. 2, and FIG. 3 in Embodiment 1, and therefore FIG. 1, FIG. 2, and FIG. 3 will be used in the following description.

FIG. 16 is a drawing showing preamble sequence tables according to Embodiment 4 of the present invention. In FIG. 16, correspondence relationships between indexes and sequence numbers are set for each number of allocated sequences. For example, when numbers of allocated sequences are designated K=1, 2, 4, 8, 16, 32, 64, seven preamble sequence tables are provided.

FIG. 16A shows a preamble sequence table for number of allocated sequences 1. In FIG. 16A, one sequence number is allocated to one index. Specifically, sequence number r=1 is correlated to index 1 and sequence number r=N−1 to index 2, and sequence number r=2 is correlated to index 3 and sequence number r=N−2 to index 4. The same kind of sequence number r correlation also applies from index 5 onward, FIG. 16B shows a preamble sequence table for number of allocated sequences 2. In FIG. 16B, two sequence numbers are allocated to one index. Specifically, sequence numbers r=1 and r=N−1 are correlated to index 1, and sequence numbers r=2 and r=N−2 are correlated to index 2. The same kind of sequence number r correlation also applies from index 3 onward.

FIG. 16C shows a preamble sequence table for number of allocated sequences 4. In FIG. 16C, four sequence numbers are allocated to one index. Specifically, sequence numbers r=1, r=2, r=N−1, and r=N−2 are correlated to index 1, and sequence numbers r=3, r=4, r=N−3, and r=N−4 are correlated to index 2. The same kind of sequence number r correlation also applies from index 3 onward. An index and sequence numbers equivalent to the number of allocated sequences are also correlated in a similar way for number of allocated sequences 8 onward.

When ZC sequence numbers are allocated to cells by sequence allocation section 52, sequences are allocated to each cell in accordance with number of allocated sequences K and a preamble sequence table corresponding to the number of allocations (FIG. 16), and allocated sequence indexes are reported to report section 53.

Report section 53 reports an index reported from sequence allocation section 52 to BS 100 that is the allocation object. Broadcast channel generation section 102 of BS 100 generates a broadcast channel including an index reported from report section 53.

Figure 17:
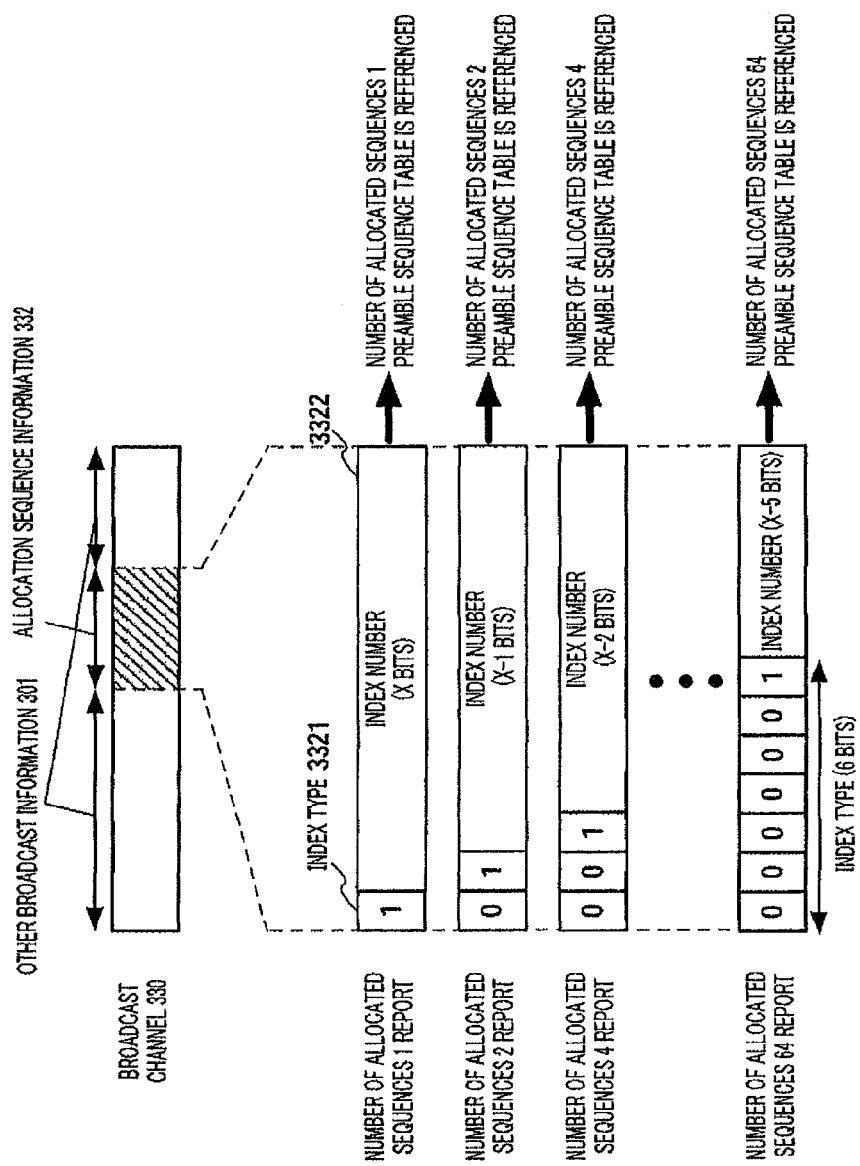
FIG. 17 is a drawing showing a configuration of a broadcast channel according to Embodiment 4 of the present invention.

FIG. 17 is a drawing showing the configuration of broadcast channel 330 generated by broadcast channel generation section 102. Broadcast channel generation section 102 references preamble sequence table storage section 113 storing the tables shown in FIG. 16, and generates allocation sequence information 332 combining index type 3321 corresponding to number of allocations K and allocated index number 3322. Allocation sequence information 332 is included in broadcast channel 330, and is reported to each UE.

Here, number of bits Z of index type 3321 increases from 1 bit to 2 bits, 3 bits, 4 bits, . . . , as number of allocations K increases from 1 to 2, 4, 8, . . . , as shown in FIG. 18. Also, as shown in FIG. 18, when the start bit of allocation sequence information is 1, this indicates a number of allocations 1 preamble sequence table, and indicates that allocation sequence information bits after the initial 1 bit are an index number. Also, when the start bits of allocation sequence information are 01, this indicates a number of allocations 2 preamble sequence table, and indicates that allocation sequence information bits after the initial 2 bits are an index number. Thereafter, in the same way, a position in which a "1" bit appears at the start of allocation sequence information represents an index type, and indicates that subsequent allocation sequence information bits are an index number.

In FIG. 18, an example has been shown in which a position in which a "1" bit first appears represents an index type, but "0" and "1" bits may be reversed, and a position in which a "0" bit first appears may represent an index type.

On the other hand, as number of allocations K increases from 1 to 2, 4, . . . , the number of bits of an index number decreases 1 bit at a time. For example, when numbers of ZC sequences are allocated in multiple fashion to preamble sequence tables as shown in FIG. 16, if the number of sequences is designated N, number of indexes $N_1$, $N_2$, $N_4$, . . . , $N_{64}$, of each table corresponding to K=1, 2, 4, 8, 16, 32, 64 become $N_1$=N, $N_2$=floor(N/2), $N_4$=floor(N/4), . . . , $N_{64}$=floor(N/64), respectively, and therefore the number of bits necessary for an index number report, if designated X bits when K=1, becomes X−1 bits, X−2 bits, X−3 bits, X−4 bits, X−5 bits, X−6 bits, respectively for K=2, 4, 8, 16, 32, 64.

Therefore, the number of bits of allocation sequence information 332 combining index type 3321 and index number 3322 can be made a constant (X+1 bits) irrespective of number of allocations K. An index type and one index number in a preamble sequence table corresponding to the index type decided in this way are reported to UE 150 from BS 100 by means of a broadcast channel. On the UE 150 side, also, tables identical to the tables shown in FIG. 16 and FIG. 18 are provided in preamble sequence table storage section 161, and usable sequence numbers can be identified using the reported index type and one index number in a preamble sequence table corresponding to the index type. UE 150 selects one sequence number from among the identified usable sequence numbers, generates an RA burst including a preamble sequence, and transmits this in an RA slot.

The effect of the above allocation sequence information report method when ZC sequence length N=839, the number of sequences is 838, the maximum number of sequences that can be allocated to one cell is 64, and the number of allocated sequences is limited as shown in FIG. 16, is described below.

Since number of allocated sequences K is limited to 1, 2, 4, 8, 16, 32, 64, the number of tables per number of allocated sequences is seven. Since the sequence length is prime number 839, the number of sequences is 838, and the number of bits necessary for an index number of each table corresponding to number of allocated sequences K=1, 2, 4, 8, 16, 32, 64 is 10 bits, 9 bits, 8 bits, 7 bits, 6 bits, and 5 bits, respectively. On the other hand, the number of bits necessary for an index type (table type) report is 1 bit, 2 bits, 3 bits, 4 bits, 5 bits, and 6 bits for each table with number of allocated sequences K=1, 2, 4, 8, 16, 32, 64. Therefore, the number of bits necessary for reporting an allocated sequence number and number of sequences is always 11.

When arbitrary sequence numbers are allocated to one cell, assuming that 10 bits are needed for an index report for each allocated sequence and the maximum number of allocated sequences is 64, a maximum of 640 report bits (=10 bits×64 sequences) are necessary, and therefore application of the report method of Embodiment 4 enables the number of signaling bits to be reduced from a maximum of 640 to 11, enabling the signaling amount to be reduced by a maximum of 98.3%.

Thus, according to Embodiment 4, the signaling overhead of allocation sequence information reported by a broadcast channel can be further reduced while reducing the amount of computation of ZC sequence correlation processing.

In FIG. 16, a configuration is shown by way of example in which an ascending order of a is used for the ZC sequence number a and N−a order of each preamble sequence table, but a descending order may be used, or a random order may be used. Furthermore, the sequence number order may be different for each preamble sequence table.

(Embodiment 5)

The configurations of a radio resource management section, BS, and UE according to Embodiment 5 of the present invention are similar to the configurations shown in FIG. 1, FIG. 2, and FIG. 3 in Embodiment 1, and therefore FIG. 1, FIG. 2, and FIG. 3 will be used in the following description.

FIG. 19 is a drawing showing a preamble sequence table according to Embodiment 5 of the present invention. In FIG. 19, one index number is allocated to each preset allocation sequence combination. For example, when the number of ZC sequences is N−1, one of sequence numbers I through N−1 is allocated respectively to index numbers 1 through N−1, a pair of sequence numbers is allocated to index numbers N through i, and a set of four sequence numbers is allocated to index numbers i+1 through j. Preset combinations of allocated sequences are also allocated in a similar way for index number i+j onward. As number of index numbers $N_2$ necessary for a part in which a pair of sequences is correlated to one index number, $N_2$=i−N=floor(N/2). Similarly, as number of index numbers $N_X$ necessary for a part in which a set of X sequences is correlated to one index number, $N_X$=floor(N/X).

Sequence allocation section 52 allocates a sequence set corresponding to a number of allocations in accordance with the preamble sequence table shown in FIG. 19. Report section 53 reports a ZC sequence allocated by sequence allocation section 52 to BS 100 that is the allocation object. Broadcast channel generation section 102 of BS 100 generates a broadcast channel including allocation sequence information reported from report section 53.

Figure 20:
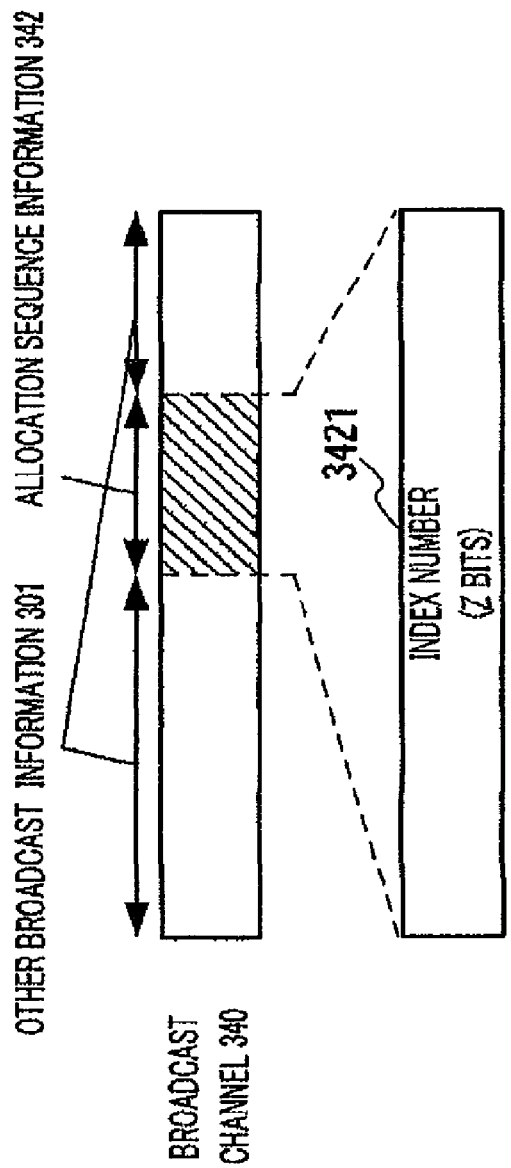
FIG. 20 is a drawing showing a configuration of a broadcast channel according to Embodiment 5 of the present invention.

FIG. 20 is a drawing showing the configuration of broadcast channel 340 generated by broadcast channel generation section 102. Broadcast channel generation section 102 references preamble sequence table storage section 113 storing the table shown in FIG. 19, generates broadcast channel 340 including index number 3421 corresponding to a set of allocation sequence numbers reported from report section 53, and reports this to each UE.

Thus, in Embodiment 5, there is a preamble sequence table that indicates correspondence relationships between allocation sequence numbers and indexes, and indexes comprise index numbers correlated to one sequence number and index numbers correlated to a plurality of sequence numbers combining sequence number r=a and sequence number r=N−a. BS 100 stores the preamble sequence table shown in FIG. 19.

When the sequence length is N, number of indexes $N_1$ correlated to a single sequence number is N−1, and for number of indexes $N_2$ correlated to two sequence numbers, $N_2$=floor(N/2). Similarly, for number of indexes $N_X$ correlated to X sequence numbers, $N_X$=floor(N/X). Thus, a part having more allocated sequences correlated to one index number in the preamble sequence table shown in FIG. 19 has fewer index numbers.

BS 100 references the stored table shown in FIG. 19, and decides a corresponding index number from an allocation sequence and number of sequences. The decided single index number is reported to UE 150 from BS 100 by means of a broadcast channel. On the UE 150 side, also, a table identical to the table shown in FIG. 19 is provided in preamble sequence table storage section 161, and usable sequence numbers are identified using the reported single index number and number-of-allocations information.

In the report method of Embodiment 5, only sequence number combinations used by the system are set beforehand, and therefore, for example, the number of cells having a large cell size—that is, having a large number of allocated sequences—is smaller than the number of cells having a small cell size—that is, having a small number of allocated sequences—making it possible to reduce the number of sequence number sets.

On the other hand, for example, since many sequence number sets having a small number of allocated sequences are obtained (N sets are obtained for number of allocated sequences 1), it is also possible to reduce the number of sequence number sets for a number of allocated sequences for which a large number of sequence number sets are obtained.

Therefore, since only an actually necessary number of sequence number combinations are reported, the number of bits used for an index number report can be utilized in a non-wasteful manner, and the signaling overhead of allocation sequence information reported by a broadcast channel can be reduced.

Thus, according to Embodiment 5, the signaling overhead of allocation sequence information reported by a broadcast channel can be reduced while reducing the amount of computation of ZC sequence correlation processing.

(Embodiment 6)

In Embodiment 1, a report method was shown whereby a start index number and number of allocated sequences are reported in accordance with a preamble sequence table, but the arrangement of sequences in a table was not considered.

Here, when UE's moving at high speed are present and cyclic shift sequences with different cyclic shift amounts are employed within the same cell, high-speed-movement related Doppler spread and frequency offset are involved in a received signal, and therefore a high correlation value occurs in a detection range of separate cyclic shift sequences generated from the same ZC sequence—that is, at a wrong timing position. On the other hand, a correlation value in an expected detection range decreases.

When a high correlation value occurs in a detection range of different cyclic shift sequences, the false detection probability for different cyclic shift sequences increases. Also, when a correlation value in an expected detection range decreases, the detection probability of a transmitted preamble becomes lower.

Figure 21:
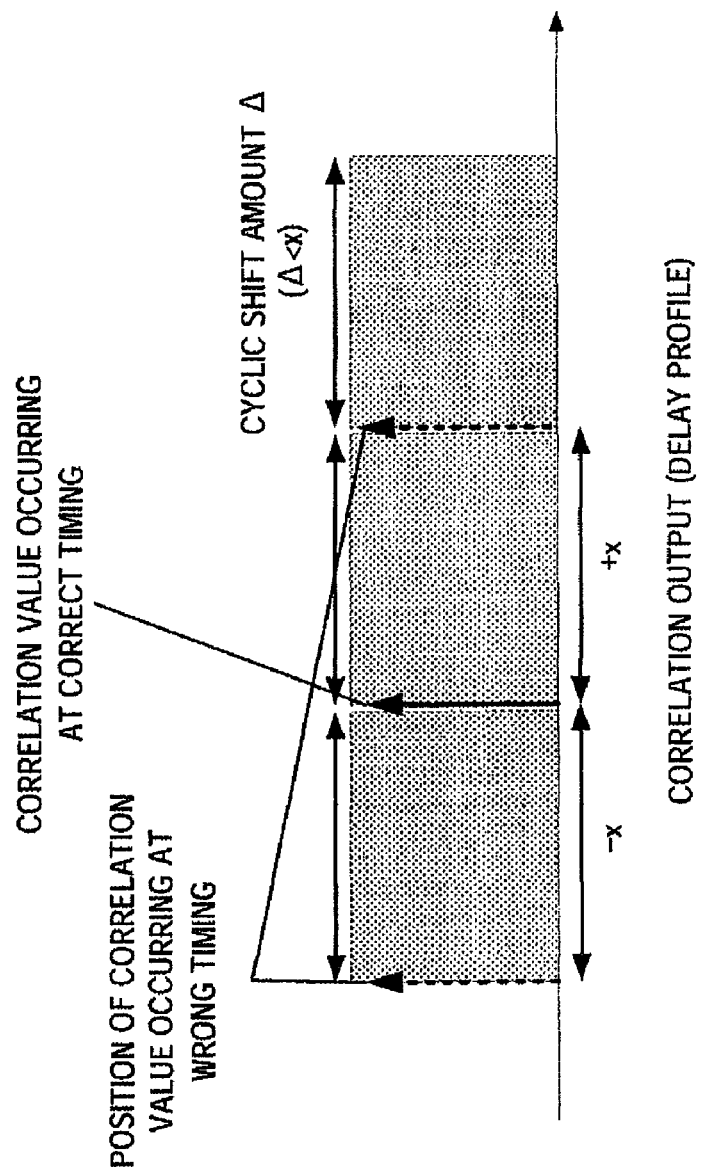
FIG. 21 is a drawing showing the relationship between a ZC sequence correlation value and cyclic shift amount Δ according to Embodiment 6 of the present invention.

FIG. 21 is a drawing showing the relationship between a correlation value and cyclic shift amount Δ of a ZC sequence transmitted from a UE when moving at high speed. As shown in FIG. 21, with regard to a correlation value for a preamble transmitted from a UE when moving at high speed, a correlation value peak occurs at timing that is wrong in a + direction or − direction equivalent to timing x corresponding to a sequence number of a ZC sequence described later herein with respect to timing of a correlation value detected when there is no Doppler spread or frequency offset transmitted from a stationary UE. Generally, with regard to the size of a correlation value peak, an erroneous correlation value peak increases while a correct-timing peak value decreases as the speed of movement of a UE increases. Therefore, if a set cyclic shift amount Δ value is greater than x (Δ>x), erroneous detection occurs in peak detection processing by a base station, and it is therefore necessary for cyclic shift amount Δ to be set to a value smaller than x (Δ<x).

In a conventional report method, it is possible to individually select and report a sequence number and cyclic shift amount for which erroneous detection does not occur so that a separate cyclic shift sequence detection range and a correlation value range in which a wrong timing of that separate cyclic shift sequence occurs do not overlap in a correlation value range in which a wrong timing occurs, but individual reporting cannot be performed in a report method of the present invention.

Thus, a preamble sequence table setting example will be shown that focuses on the fact that a difference between a position of a correlation value at which a used sequence occurs at a wrong timing and a correct-timing position depends on a sequence number, and usable sequence numbers are limited by the cell radius since a range in which a correlation value occurs depends on the cell radius.

The configurations of a radio resource management section, BS, and UE according to Embodiment 6 of the present invention are similar to the configurations shown in FIG. 1, FIG. 2, and FIG. 3 in Embodiment 1, and therefore FIG. 1, FIG. 2, and FIG. 3 will be used in the following description.

FIG. 22 is a drawing showing a preamble sequence table according to Embodiment 6 of the present invention. In FIG. 22, index numbers are allocated one at a time to sequence numbers r in a case in which sequence length N is 37 (a prime number). Sequence length N is not limited to 37.

A preamble sequence table is used in which, when ZC sequences defined in the time domain as in Equations (1) through (5) in the above embodiments are used, indexes are allocated in a sequence number r order that satisfies following Equation (6) for u=1, 2, 3, . . . , N−1.

$$[6]\ (r \cdot u) \bmod N = N-1, u=1,2,3,\ldots,N-1 \qquad \text{(Equation 6)}$$

When sequence length N in FIG. 22 is 37, sequence number r=1 is correlated to index 1, and sequence number r=18 to index 2. A value of r that satisfies Equation (6) is also correlated in a similar way to index 3 onward. The sequence number r order may also be an order that satisfies Equation (6) for u=N−1, N−2, . . . , 3, 2, 1.

Sequence allocation section 52 performs sequence set allocation corresponding to a number of allocations in accordance with the preamble sequence table shown in FIG. 22. Report section 53 reports a ZC sequence allocated by sequence allocation section 52 to BS 100 that is the allocation object. Broadcast channel generation section 102 of BS 100 generates a broadcast channel including allocation sequence information reported from report section 53.

Broadcast channel generation section 102 references preamble sequence table storage section 113 storing the table shown in FIG. 22, and generates allocation sequence information 302 combining start index number 3021 and number of allocated sequences 3022 of allocated ZC sequences. Allocation sequence information is included in broadcast channel 300, and is reported to each UE.

One index number and a number of allocations decided in this way are reported to UE 150 from BS 100 by means of a broadcast channel. On the UE 150 side, also, a table identical to the table shown in FIG. 22 is provided in preamble sequence table storage section 161, and usable sequence numbers are identified using the reported single index number and number-of-allocations information.

In the report method of Embodiment 6, BS 100 allocates sequences with consecutive sequence numbers to the same cell based on a preamble sequence table set by means of Equation (6). If this table is used, relative differences x between a position of a correlation value that occurs at a wrong timing and a position of a correlation value that occurs at correct timing are arranged in the order +/−1, +/−2, . . . , +/−18, −/+18, −1+17, . . . , −/+1.

In base station 100, it is necessary for setting to be performed so that cyclic shift amounts Δ for a correlation value that occurs at correct timing and a correlation value that occurs at a wrong timing do not mutually overlap in order to prevent the occurrence of erroneous detection of a preamble. That is to say, it is necessary for the condition cyclic shift amount Δ<relative difference x to be satisfied. Therefore, as shown in FIG. 23, applicable cyclic shift amount Δ values are also 1, 2, . . . , 18, 18, 17, . . . , 1.

On the other hand, required cyclic shift amount Δ is set so as to be greater than the sum of the maximum round-trip propagation delay time ($T_{PropagationDelay}$) expected value between BS 100 and UE 150 supported by the relevant cell and the maximum expected value of channel multipath delay time ($T_{DelaySpread}$). That is to say, setting is performed so that required cyclic shift amount Δ>2×$T_{RoundTripDelay}$+$T_{DelaySpread}$. Therefore, sequence numbers that can be applied to this cell are limited to sequences for which relative difference x satisfies the condition x>shift amount Δ>2×$T_{RoundTripDelay}$+$T_{DelaySpread}$.

In the preamble sequence table shown in FIG. 23, applicable cyclic shift amount Δ(<x) values are arranged in ascending order and descending order—that is, sequence numbers are arranged in an order proportional to the cell radius—and therefore even if N sequences are allocated consecutively, it is easy to perform allocation so that a sequence that cannot be utilized due to cell radius constraints is not included.

Also, since differences between a position of a correlation value that occurs at a wrong timing and a position of a correlation value that occurs at correct timing are allocated to index numbers in ascending order (index numbers 1 through floor (N/2)) and descending order (index numbers floor(N/2) through N−1), it is possible for sequence number r for which a range in which a correlation value occurs is in a close relationship to be allocated, it is possible for sequence allocation to be performed such that the number of cyclic shift sequences that can be generated from one ZC sequence is maximized, and sequence consumption can be reduced.

Thus, according to Embodiment 6, it is possible to report only usable sequence allocations in a non-wasteful manner even in a cell in which a UE moving at high speed is present, while reducing the signaling overhead of allocation sequence information reported by a broadcast channel.

A preamble sequence table may also employ an r order that satisfies Equation (7) for u. FIG. 24 shows an example of a preamble sequence table that satisfies Equation (7) when sequence length N=37. That is to say, sequence number r=N−1 corresponding to u=1 is allocated to index number 1, sequence number r=1 corresponding to u=N−1 is allocated to index number 2, and sequence number r corresponding to u satisfying Equation (7) is also allocated in a similar way for index number 3 onward.

$$[7](r \cdot u) \bmod N = N-1, u=1, N-1, 2N-2, 3, N-3, \ldots, \text{floor}(N/2), N-\text{floor}(N/2) \quad \text{(Equation 7)}$$

In this case, for a sequence number r=a and r=N−a pair an applicable cell radius, position of a correlation value argument at a wrong timing, and so forth, are identical, and therefore it is further possible to report only usable sequence allocations in a non-wasteful manner even in a cell in which UE 150 moving at high speed is present. Also, in Equation (7), usable cyclic shift amount Δ is the same for a u=b and u=N−b order, and therefore either a u=b, u=N−b or a u=N−b, u=b order may be used.

A configuration applying Equation (6) and Equation (7) to an a order for sequence numbers a and N−a described in above Embodiments 1 through 5 may also be used.

Above Equation (6) may also be Equation (8) below.

$$[8](r \cdot u) \bmod N = 1, u=1, 2, 3, \ldots, N-1 \quad \text{(Equation 8)}$$

In the above embodiments, descriptions have been given using ZC sequences, but the present invention is not limited to this, and GCL sequences may also be used.

Regarding the sign within exp of a ZC sequence and GCL sequence in Equations (1) through (5), −j may be used or +j may be used.

In the above embodiments, configurations have been shown in which a number of allocated sequences or number of indexes is reported, but in a system that makes combined use of cyclic shift sequences, if the number of RA preambles used in a cell is known beforehand by a BS and UE, a configuration may be used in which a number of cyclic shift sequences is reported instead of reporting a number of allocated sequences or number of indexes. This is because a number of allocated sequences or number of indexes can be acquired by dividing the number of preambles used in a cell by the number of cyclic shift sequences.

Also, in a system that makes combined use of cyclic shift sequences, if the number of RA preambles used in a cell is known beforehand by a BS and UE, a configuration may be used in which cyclic shift amount Δ is reported instead of reporting a number of allocated sequences or number of indexes. This is because a number of allocated sequences or number of indexes can be acquired from a number of cyclic shift sequences obtained from sequence length N and cyclic shift amount Δ.

Furthermore, in a system that makes combined use of cyclic shift sequences, if the number of RA preambles used in a cell is known beforehand by a BS and UE, a configuration may be used in which the cell size (radius) is reported instead of reporting a number of allocated sequences or number of indexes. This is because a number of allocated sequences or number of indexes can be acquired by obtaining required cyclic shift amount Δ from the cell size (radius).

In the above embodiments, configurations have been shown in which a preamble sequence table is used for correspondence relationships between sequence numbers and indexes, but a configuration may also be used in which a correspondence relationship between a sequence number and index is obtain by means of an equation, such as sequence number=f(index number).

In the above embodiments, cases have been described by way of example in which the present invention is configured as hardware, but it is also possible for the present invention to be implemented by software.

The function blocks used in the descriptions of the above embodiments are typically implemented as LSI's, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosure of Japanese Patent Application No. 2007-071194, filed on Mar. 19, 2007, including the specification, drawings and abstract, is incorporated herein by reference in its entirety.

Industrial Applicability

A sequence report method and sequence report apparatus according to the present invention enable a signaling amount (number of bits) of a broadcast channel that reports different ZC sequences or GCL sequences allocated to one cell from a base station to a terminal to be reduced, and are suitable for use in a mobile communication system or the like, for example.

The invention claimed is:

1. A mobile station apparatus comprising:
 a receiving section configured to receive an index of at least one of sequences with consecutive indices among a plurality of sequences, which are indexed by the indices having consecutive numbers in order of generally increasing to a maximum value and then decreasing, from the maximum value, a cyclic shift amount corresponding to a Doppler shift according to a sequence number; and
 a transmitting section configured to transmit a preamble sequence generated from a sequence corresponding to the index that is received.

2. The mobile station apparatus according to claim 1, wherein the cyclic shift amount corresponding to the Doppler shift is a cyclic shift amount corresponding to a Doppler shift for a mobile station moving at high speed.

3. The mobile station apparatus according to claim 1, wherein the cyclic shift amount depends on the sequence number.

4. A mobile station apparatus comprising:
 a receiving section configured to receive an index of at least one of sequences with consecutive indices among a plurality of sequences, which are indexed by the indices having consecutive numbers in order of generally increasing to a maximum value and then decreasing, from the maximum value, a required cyclic shift amount according to a sequence number; and
 a transmitting section configured to transmit a preamble sequence generated from a sequence corresponding to the index that is received.

5. The mobile station apparatus according to claim 4, wherein the required cyclic shift amount is a required cyclic shift amount for a mobile station moving at high speed.

6. The mobile station apparatus according to claim 4, wherein the required cyclic shift amount is equal to or less than a cyclic shift amount corresponding to a Doppler shift.

7. The mobile station apparatus according to claim 4, wherein the required cyclic shift amount is a maximum cyclic shift amount that is equal to or less than a cyclic shift amount corresponding to a Doppler shift.

8. The mobile station apparatus according to claim 4, wherein the required cyclic shift amount is a maximum cyclic shift amount available for a Doppler shift.

9. The mobile station apparatus according to claim 1, wherein the plurality of sequences are indexed by the indices having consecutive numbers in the sequence number order of a and N−a, wherein N is a sequence length and a is an integer whose value ranges between 1 and N−1.

10. The mobile station apparatus according to claim 9, wherein the plurality of sequences are indexed by the indices having consecutive numbers in the sequence number order of a and N−a, and wherein the integers a are not in consecutive order.

11. The mobile station apparatus according to claim 1, wherein the plurality of sequences are indexed by the indices having consecutive numbers in order of generally increasing to a maximum value and then decreasing, from the maximum value, an available cell radius.

12. The mobile station apparatus according to claim 1, wherein the plurality of sequences are indexed by the indices having consecutive numbers in order of generally increasing to a maximum value and then decreasing, from the maximum value, a cell radius for a mobile station moving at high speed.

13. The mobile station apparatus according to claim 1, wherein the sequence is a Zadoff-Chu sequence.

14. The mobile station apparatus according to claim 1, wherein the preamble sequence is generated by cyclically shifting at least one of sequences with consecutive indices, the at least one of sequences corresponding to the index that is received.

15. The mobile station apparatus according to claim 1, wherein a random access preamble including the preamble sequence is generated, and said transmitting section transmits the random access preamble.

16. The mobile station apparatus according to claim 1, wherein said receiving section is configured to receive the index that is broadcasted.

17. A sequence generating method comprising:
 receiving an index of at least one of sequences with consecutive indices among a plurality of sequences, which are indexed by the indices having consecutive numbers in order of generally increasing to a maximum value and then decreasing, from the maximum value, a cyclic shift amount corresponding to a Doppler shift according to a sequence number; and
 transmitting a preamble sequence generated from a sequence corresponding to the index that is received.

18. A sequence generating method comprising:
 receiving an index of at least one of sequences with consecutive indices among a plurality of sequences, which are indexed by the indices having consecutive numbers in order of generally increasing to a maximum value and then decreasing, from the maximum value, a required cyclic shift amount according to a sequence number; and
 transmitting a preamble sequence generated from a sequence corresponding to the index that is received.

* * * * *